United States Patent
Hiromi et al.

(10) Patent No.: US 10,534,446 B2
(45) Date of Patent: *Jan. 14, 2020

(54) OPEN LOOP CORRECTION FOR OPTICAL PROXIMITY DETECTORS

(71) Applicant: INTERSIL AMERICAS LLC, Milpitas, CA (US)

(72) Inventors: Itaru Hiromi, Sunnyvale, CA (US); Philip V. Golden, Cambridgeshire (GB); Steven Herbst, Berkeley, CA (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,437

(22) Filed: May 21, 2018

(65) Prior Publication Data
US 2018/0267623 A1  Sep. 20, 2018

Related U.S. Application Data

(63) Continuation of application No. 14/718,563, filed on May 21, 2015, now Pat. No. 9,977,512.

(Continued)

(51) Int. Cl.
*G08B 21/00* (2006.01)
*G06F 3/03* (2006.01)
(Continued)

(52) U.S. Cl.
CPC ............ *G06F 3/0304* (2013.01); *G01S 7/497* (2013.01); *G01S 7/4918* (2013.01); *G01S 17/36* (2013.01)

(58) Field of Classification Search
CPC ... G06F 3/0304; G01N 2201/06; G01S 7/495; G08B 17/103; G08B 21/00
See application file for complete search history.

(56) References Cited

U.S. PATENT DOCUMENTS 6,195,157 B1    2/2001   Yamashita et al.
6,339,740 B1 *  1/2002   Seto .................... B60K 31/0008
                                                340/904

(Continued)

FOREIGN PATENT DOCUMENTS

TW    201202730 A    1/2012
TW    201333512 A1   8/2013
TW    201432283 A    8/2014

OTHER PUBLICATIONS

Burns et al., System design of a pulsed laser rangefinder, Optical Engineering vol. 30, No. 3 (Mar. 1991), pp. 323-329.

(Continued)

*Primary Examiner* — Phung Nguyen
(74) *Attorney, Agent, or Firm* — Foley & Lardner LLP

(57) ABSTRACT

An optical proximity detector includes a driver, light detector, analog front-end, sensor(s) that sense correction factor(s) (e.g., temperature, supply voltage and/or forward voltage drop), and a digital back end. The driver drives the light source to emit light. The light detector produces a light detection signal indicative of a magnitude and a phase of a portion of the emitted light that reflects off an object and is incident on the light detector. The analog front-end receives the light detection signal and outputs a digital light detection signal, or digital in-phase and quadrature-phase signals, which are provided to the digital back-end. The digital back-end performs closed loop correction(s) for dynamic variation(s) in gain and/or phase caused by a portion of the analog front-end, uses polynomial equation(s) and sensed correction factor(s) to perform open loop correction(s) for dynamic variations in temperature, supply voltage and/or forward voltage drop, and outputs a distance value.

18 Claims, 10 Drawing Sheets

Related U.S. Application Data

(60) Provisional application No. 62/068,257, filed on Oct. 24, 2014.

(51) Int. Cl.
 G01S 17/36 (2006.01)
 G01S 7/497 (2006.01)

(56) References Cited

U.S. PATENT DOCUMENTS

| | | |
|---|---|---|
| 8,274,037 B2 | 9/2012 | Ritter et al. |
| 8,610,043 B2 | 12/2013 | Baxter |
| 9,642,215 B2 | 5/2017 | Verma |
| 9,752,925 B2 | 9/2017 | Chu et al. |
| 2004/0056199 A1* | 3/2004 | O'Connor .......... G01J 5/06 250/341.1 |
| 2010/0128109 A1 | 5/2010 | Banks |
| 2011/0181861 A1* | 7/2011 | Ritter .......... G01J 1/46 356/3 |
| 2011/0248151 A1* | 10/2011 | Holcombe .......... G01S 3/7803 250/221 |
| 2013/0169947 A1* | 7/2013 | Hakim .......... G01N 21/53 356/3.1 |
| 2014/0152974 A1 | 6/2014 | Ko |
| 2014/0191114 A1 | 7/2014 | Russo et al. |
| 2014/0213323 A1* | 7/2014 | Holenarsipur .......... H03K 17/955 455/566 |
| 2014/0252213 A1* | 9/2014 | Ruh .......... H01L 31/125 250/227.11 |

OTHER PUBLICATIONS

Hebert et al., 3-D measurements from imaging laser radars: how good are they? IEEE/RSJ International Workshop on Intelligent Robots and Systems IROS '91 (Nov. 1991), pp. 359-364.

Intersil Corporation's HSP50110 Data Sheet, dated Mar. 2001, File No. 3651.6, pp. 1-25.

Gokturk et al., "A Time-Of-Flight Depth Sensor—System Description, Issues and Solutions", Proceedings of the 2004 IEEE Computer Society Conference on Computer Vision and Pattern Recognition Workshops (CVPRW'04) 1063-6919/04, Jun. 2004.

Hu et al., "FPGA-Based Digital Phase-Locked Loop Analysis and Implementation", Master Thesis, University of Illinois, 2011.

Nash et al., "Correcting Imperfections in IQ Modulators to Improve RF Signal Fidelity", Analog Devices, AN-1039 Application Note, 2009.

Nejad, et al., "Comparison of TOF, FMCW and Phase-Shift Laser Range-Finding Methods by Simulation and Measurement", Quartarly Journal of Technology & Education, vol. 1, No. 1, Sep. 2006.

Perenzoni et al., "Figures of Merit for Indirect Time-of-Flight 3D Cameras: Definition and Experimental Evaluation", Remote Sensing 2011, 3, pp. 2461-2472, Nov. 2011.

Sabah et al., "Design and Calibration of IQ-Mixers", Design and Calibration of IQ-mixers. Jun. 1998, Prepared for Conference: C98-06-22, p. 1589-1591.

Stmicroelectronics, "STMicroelectronics Proximity Sensor Solves Smartphone Hang-ups", Press Release, Geneva, Feb. 25, 2013, http://www.sl.com/web/en/press/p3397.

\* cited by examiner

OPEN LOOP CORRECTION FOR OPTICAL PROXIMITY DETECTORS

PRIORITY CLAIM

The present application is a continuation of U.S. patent application Ser. No. 14/718,563 filed May 21, 2015, now U.S. Pat. No. 9,977,512. The present application also claims priority to U.S. Provisional Patent Application No. 62/068,257, filed Oct. 24, 2014, which is incorporated herein by reference, which is incorporated herein by reference.

RELATED APPLICATIONS

This application relates to commonly assigned U.S. patent application Ser. No. 14/495,688, entitled "Optical Proximity Detectors," which was filed Sep. 24, 2014, and commonly assigned U.S. patent application Ser. No. 14/718,844, entitled "Precision Estimation for Optical Proximity Detectors" filed May 21, 2015, each of which is incorporated herein by reference.

BACKGROUND

Optical proximity detectors (which can also be referred to as optical proximity sensors or optical proximity detection sensors) typically include or use a light source and an adjacent photosensitive light detector. Such optical proximity detectors can be used to detect the presence of an object, estimate proximity of (e.g., distance to) an object and/or detect motion of an object, based on the light originating from the light source that is reflected from an object and detected by the light detector. Where such detectors are specifically used to detect distance to an object, they can also be referred to as optical distance detectors or optical distance sensors. Where such detectors rely on time-of-flight (TOF) principles to detect distance to an object, they can also be referred to as optical TOP sensors, optical TOP proximity sensors, optical TOF proximity detectors, or the like. The value of these detectors/sensors has become more important with the advent of battery-operated handheld devices, such as mobile phones. For example, a fair amount of the energy from a mobile phone battery is used to drive the display, and there is value in turning off the display or backlight when the mobile phone or other device is brought to the user's ear (where it cannot be viewed anyway). Optical proximity detectors have been used for this, and many other applications.

For other examples, there are many other applications in which the presence of an object can be detected with an optical proximity detector to advantage. These range from sensing when protective covers have been opened on machinery, paper has been positioned correctly in a printer, or an operator's hands are at risk near an operating machine. An optical proximity detector can also be used as a simple touch or near-touch activated switch, and could be implemented in applications like keyboards or devices that have a plastic housing that is sealed but which allows the light from the source to pass through and be sensed by the detector on the return.

DETAILED DESCRIPTION

Figure 1:
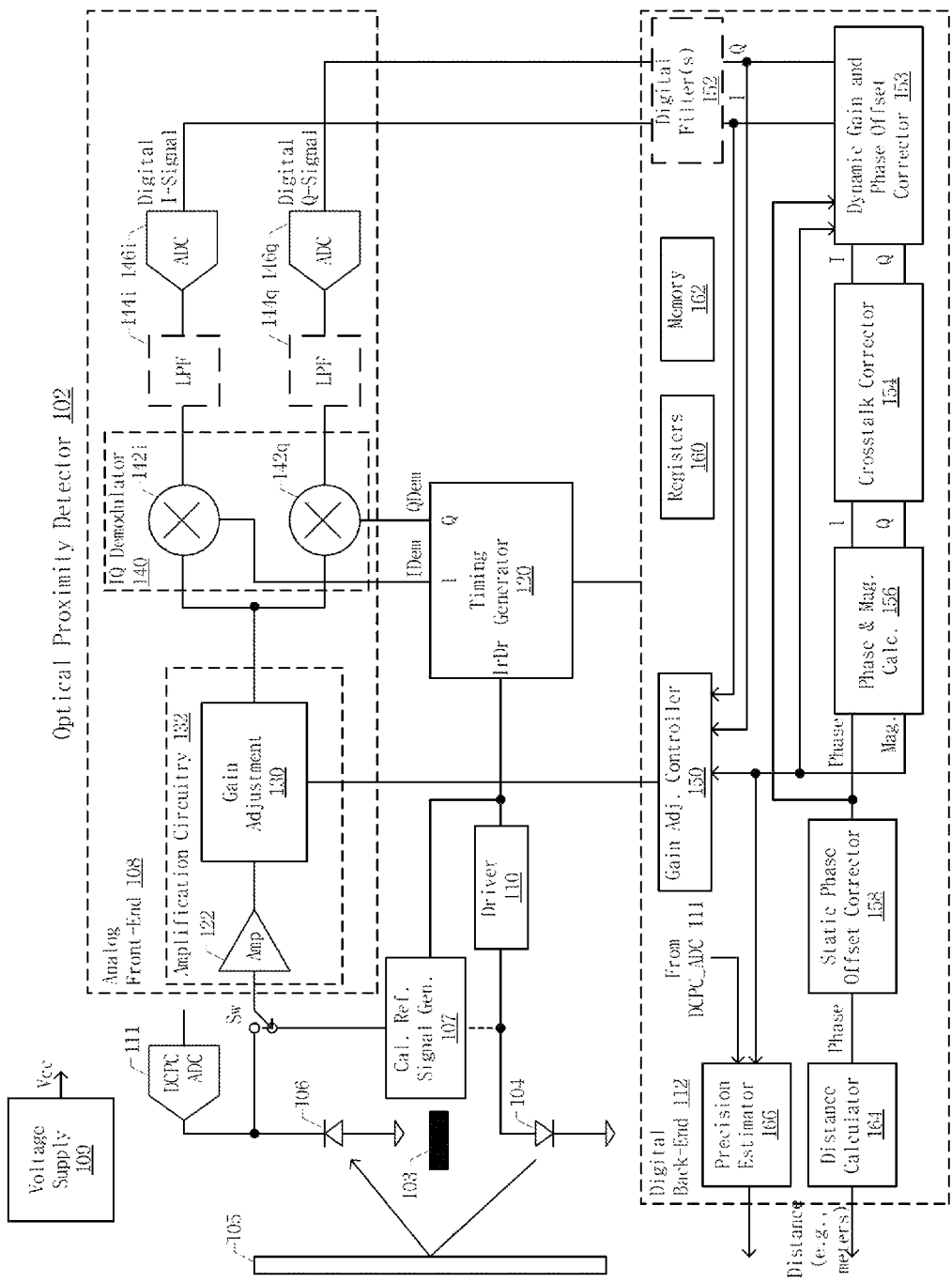
FIG. 1 illustrates an embodiment of an optical proximity detector.

FIG. 1 illustrates an optical proximity detector 102 that was disclosed commonly assigned U.S. patent application Ser. No. 14/495,688, entitled "Optical Proximity Detectors," which was filed Sep. 24, 2014. Where the optical proximity detector 102 is used for detecting a distance to an object (e.g., 105), the optical proximity detector 102 can alternatively be referred to as an optical distance detector 102. Where the optical proximity detector 102 relies on time-of-flight (TOF) principles to detect distance to an object, it can also be referred to more specifically as an optical TOF distance sensor, an optical TOF proximity sensor, an optical TOF proximity detector, or the like. Referring to FIG. 1, the optical proximity detector 102 is shown as including an infrared light source 104, a light detector 106, analog front-end circuitry 108, digital back-end circuitry 112, a driver 110 and a timing generator 120. The light source 104 and the light detector 106 can also be considered part of the analog front-end circuitry 108. The analog front-end circuitry 108 can also be referred to as an analog front-end (AFE), a front-end channel, or simply a front-end. Similarly, the digital back-end circuitry 108 can also be referred to as a digital back-end, a back-end channel, or simply a back-end. The timing generator 120 can include, e.g., a local oscillator that outputs a high frequency signal (e.g., 4.5 MHz or 5 MHz), and a phase shifter that shifts the phase of the high frequency signal by 90 degrees. As will be described in additional detail below, the high frequency signal (e.g., 4.5 MHz or 5 MHz) may be provided to the driver 110 and the front-end 108, and the high frequency signal shifted by 90 degrees may also be provided to the front-end 108. The timing generator 120 can also include circuitry to produce signals of other frequencies, e.g., lower and/or higher frequencies, which may be used by various other blocks of the optical proximity detector 102. The optical proximity detector 102 is also shown as including a voltage supply 109 that produces a supply voltage labeled Vcc. The supply voltage output by the voltage supply 109 can be used to directly power the various components of both the analog front-end 108 and the digital back-end 112. It is also possible that the supply voltage output by the voltage supply 109 be stepped-up or stepped-down to one or more other voltages that is/are used to power specific components of the analog front-end 108 and/or the digital back-end 112.

The infrared light source 104 can be, e.g., one or more infrared light emitting diode (LED) or infrared laser diode, but is not limited thereto. While infrared (IR) light sources are often employed in optical proximity detectors, because the human eye cannot detect IR light, the light source can alternatively produce light of other wavelengths. Accordingly, the infrared light source 104 can be referred to more generically as the light source 104. The light detector 106 can be, e.g., one or more photodiode (PD), but is not limited thereto. When implemented as a PD operating in a photoconductive mode, the light detector 106 converts detected light into a current signal. If implemented as a PD operating in photovoltaic mode, the light detector 106 would convert detected light into a voltage signal. Unless stated otherwise, it will be assumed for the sake of this description that the light detector 106 is a PD operating in the photoconductive mode.

In accordance with an embodiment, the front-end 108 receives a wide range of input currents (from the light detector 106) at a high frequency (e.g., 4.5 MHz or 5 MHz), and conditions the signal for digitizing. Such conditioning can include adjusting gain to increase and preferably optimize dynamic range, filtering to increase and preferably optimize signal-to-noise ratio (SNR), and IQ demodulating to simplify digital back-end processing. In accordance with an embodiment, the digital back-end 112 performs additional filtering, corrects for dynamic gain and phase offset errors, corrects for crosstalk errors, and calculates a phase that is indicative of a distance between the optical proximity detector 102 and a target 105. The digital back-end 112 can also correct for static phase offset errors. Additionally, the digital back-end 112 generates one or more control signals for the analog front-end 108. Additional details of the analog front-end 108 and the digital back-end 112 are described below.

Still referring to FIG. 1, in accordance with an embodiment, the analog front-end 108 includes an amplifier 122, a gain adjustment circuit 130, an IQ demodulator circuit 140, analog low pass filters 144*i*, 144*q* and analog-to-digital converters (ADCs) 146*i*, 146*q*. While ADCs 146*i* and 146*q* are illustrated as two separate ADCs, a single ADC can instead be used, where the single ADC is time shared between the I and Q channels. In accordance with an embodiment, the digital back-end 112 includes a gain adjustment controller 150, one or more digital filter(s) 152, a dynamic gain and phase offset corrector 153, a crosstalk corrector 154, a phase and magnitude calculator 156 and a static phase offset corrector 158. The digital back-end 112 is also shown as including a distance calculator 164 and a precision estimator 166. In accordance with an embodiment, each of the blocks within the digital back-end 112 are implemented using a digital signal processor (DSP). Alternatively, each of the blocks within the digital back-end 112 can be implemented using digital circuitry. It is also possible that some of the blocks of the digital back-end 112 can be implemented using a DSP, while other blocks are implemented using digital circuitry. In certain embodiments, one or both of the distance calculator 164 and the precision estimator 166 are implemented external to the digital back-end 112, and optionally external to the optical proximity detector. For example, the precision estimator 166 can be implemented by a dedicated digital chip, or a host MCU, but is not limited thereto.

The driver circuit 110 produces a drive signal in dependence on a drive timing signal (also referred to as the IrDr timing signal) produced by the timing generator 120. The drive timing signal can be, e.g., a 4.5 MHz square wave signal, but is not limited thereto. This drive signal is used to drive the infrared light source 104, in response to which the infrared light source 104 emits infrared light. The modulation frequency of the emitted infrared light, which can also be referred to as the carrier frequency, is dependent on the frequency of the drive timing signal (e.g., 4.5 MHz). In other words, where the infrared light source 104 is driven by a 4.5 MHz drive signal, then the carrier frequency of the emitted infrared light will be 4.5 MHz.

If there is a target 105 (which can more generally be referred to as an object 105) within the sense region (i.e., field of view and range) of the optical proximity detector 102, infrared light emitted by the infrared light source 104 will be reflected from the target 105, and a portion of the reflected infrared light will be incident on the light detector 106. In response to detecting light, the light detector 106 produces a light detection signal that is indicative of the magnitude and the phase of the detected light. The magnitude of the light detection signal can be dependent, e.g., on the distance between the target 105 and the optical proximity detector 102 and the color of the target. In general, all other things being equal, the closer the target 105, the greater the magnitude of the light detection signal. Further, all other things being equal, if a target has a white color, or another highly reflective color, the magnitude of the light detection signal will be greater than if the target has a black color, or another lowly reflective color. By contrast, the phase of the light detection signal should be primarily dependent on the distance between the target 105 and the optical proximity detector 102, and should not depend on the color or reflectivity of the target 105.

While not shown in FIG. 1, one or more optical filter can be located in front of the light detector 106 to reflect and/or absorb wavelengths that are not of interest. For a more specific example, one or more optical filters can be used to reject ambient visible light and pass infrared light. Alternative and/or additional techniques for rejecting and/or compensating for ambient visible light can be used, as are known in the art.

Infrared light emitted by the light source 104 and detected by the light detector 106, which has not been reflected off of the target object 105, is considered optical crosstalk that reduces the capability of the overall device or system to sense distance. Some such light may travel directly from the light source 104 to the light detector 106. To reduce and preferably prevent light from traveling directly from the light source 104 to the light detector 106, an opaque light barrier (shown as element 103 in FIG. 1) can be used to isolate the light source 104 from the light detector 106. However, light barriers are often imperfect, resulting in light leaking under, over and/or through the barrier. Additionally, optical crosstalk may result from specular reflections and/or other types of backscatter, especially where the light source 104 and the light detector 106 are covered by a glass or plastic cover plate, as is known in the art.

The light detection signal produced by the light detector 106 can be amplified by an optional amplifier 122 (which has a fixed gain) before the light detection signal is provided to a gain adjustment circuit 130. The optional amplifier 122 can also be used to convert a current signal to a voltage signal, or vice versa, depending upon whether there is a desire to perform signal processing in the voltage or current domain, and depending upon whether the light detector 106 produces a voltage signal or a current signal indicative of the magnitude and phase of detected light. For example, the amplifier 122 can be a transimpedance amplifier (TIA) having a fixed gain. Most signals described herein are referred to generically as a signal, without specifying whether the signal is a current signal or a voltage signal. This is because either type of signal can be used, depending upon implementation. Unless stated otherwise, it will be assumed that the amplifier 122 is a transimpedance amplifier (TIA) that converts a current signal produced by the light detector 106 to a voltage signal, and that further processing by the front-end 108 is done in the voltage domain, as opposed to the current domain. The amplifier 122 and the gain adjustment circuit 130 collectively, or individually, can be referred to as amplification circuitry 132, or more specifically, as analog amplification circuitry 132.

The optical proximity detector 102 is also shown as including a DC photocurrent (DCPC) analog-to-digital converter (ADC) 111, which is used to produce digital values indicative of the DC current produced by the light detector 106 when the infrared light source 104 is not emitting infrared light. In other words, the DCPC ADC 111 is used to measure the shot noise of the optical proximity detector 102. The output of the DCPC ADC 111 is provided to a precision estimator 166, which is discussed in more detail below.

Still referring to FIG. 1, the gain adjustment circuit 130 includes at least one variable gain amplifier (VGA) that is controlled by the gain adjustment controller 150. Within this document, the light detection signal, as the term is used herein, is a signal indicative of the magnitude and the phase of the light detected by the light detector 106, whether or not the signal is amplified by the optional fixed gain amplifier 122. The gain adjustment circuit 130 adjusts the amplitude of light detection signal in dependence on one or more gain adjustment signal received from the gain adjustment, controller 150, as will be described in additional detail below. The output of the gain adjustment circuit 130, which can be referred to as the amplitude adjusted light detection signal, is provided to the IQ demodulator 140. More generally, the output of the analog amplification circuitry 132 can be referred to as the amplitude adjusted light detection signal.

The gain adjustment circuit 130 can also include, for example, a band-pass filter (BPF), which reduces the bandwidth of the front-end 108 to reject noise that would otherwise adversely affect the front-end 108. The BPF can, for example, have a center frequency of 5 MHz, a 3 dB 500 kHz bandwidth, a lower cutoff frequency of 4.75 MHz and an upper cutoff frequency of 5.25 MHz. For another example, the BPF can have a center frequency of 4.5 MHz, a. 3 dB 500 kHz bandwidth, a lower cutoff frequency of 4.25 MHz and an upper cutoff frequency of 5.75 MHz. The BPF can be between a pair of VGAs of the gain adjustment circuit 130. This is just an example, which is not meant to be limiting.

The IQ demodulator 140 separates the amplitude adjusted light detection signal into an in-phase signal and a quadrature-phase signal (which can also be referred to respectively as an I-component and a Q-component, or as simply as an I-signal and a Q-signal), wherein the quadrature-phase signal is 90 degrees out of phase relative to the in-phase signal. In an embodiment, the IQ demodulator 140 includes a pair of mixers, labeled 142$i$ and 142$q$, which can also be referred to as multipliers 142$i$ and 142$q$. Both of the mixers 142$i$, 142$q$ receive the same amplitude adjusted light detection signal from the gain adjustment circuit 130. The mixer 1.42$i$ multiplies the amplitude adjusted light detection signal by an in-phase demodulation signal (IDem) produced by the timing generator 120. The mixer 142$q$ multiplies the amplitude adjusted light detection signal by a quadrature-phase demodulation signal (QDem) produced by the timing generator 120.

In accordance with an embodiment, the in-phase demodulation signal (IDem) has the same phase as (i.e., is in phase with) the drive timing signal (also referred to as the IrDr timing signal) produced by the timing generator 120, which is used to generate the drive signal that drives the light source 104; and the quadrature-phase demodulation signal (QDem) is 90 degrees out of phase from the in-phase demodulation signal (IDem) (and thus, is 90 degrees out of phase from the drive timing signal produced by the timing generator 120). While separating the amplitude adjusted light detection signal into in-phase and quadrature-phase signals, the mixers 142$i$, 142$q$ also down convert these signals to baseband.

In an embodiment, the in-phase signal and the quadrature-phase signal (both of which are output by the IQ demodulator 140) are low pass filtered by respective optional analog LPFs 144$i$, 144$q$ and digitized by respective ADCs 146$i$, 146$q$. The optional analog LPFs 144$i$, 144$q$ can be used to filter out harmonics and high frequency noise that are not of interest, which result from the mixing performed by the mixers 142$i$, 142$q$. The output of the ADC 146$i$ can be referred to as a digital in-phase signal, and the output of the ADC 146$q$ can be referred to as a digital quadrature-phase signal.

The digital in-phase signal and the digital quadrature-phase signal output by the front-end 108, which can be referred to respectively as the digital I-signal and the digital Q-signal, are provided to the digital back-end 112. As mentioned above, the digital back-end 112 is shown as including one or more optional digital filter(s) 152, a dynamic gain and phase offset corrector 153, a crosstalk corrector 154, a phase and magnitude calculator 156, a static phase offset corrector 158, and a gain adjustment controller 150. The digital back-end 112 is also shown as including the distance calculator 164. Additionally, the digital back-end 112 is shown as including a precision estimator 166, which is discussed in additional detail below. It is also possible that the distance calculator 164 and/or the precision estimator 166 is/are external to the digital back-end, and more generally, external to the optical proximity detector 102.

Each of the digital filter(s) 152 can, for example, be implemented as an integrate-and-dump circuit, in which case it can also be referred to as a decimator, an integrate-and-dump decimator, or an integrate-and-dump filter. For example, one digital filter 152 can integrate the digital in-phase signal for a period of time and then output (a.k.a. dump) the result, at which point it is reset and repeats the integration and dump functions for another period of time, and so on; and another digital filter 152 can integrate the digital quadrature-phase signal for a period of time and then output (a.k.a. dump) the result, at which point it is reset and repeats the integration and dump functions for another period of time, and so on. Other implementations of the digital filter(s) 152 are also possible.

In accordance with an embodiment, the gain adjustment controller 150 determines or approximates the amplitude of the IQ vector provided to it to thereby adjust the gain of the VGA(s) of the gain adjustment circuit 130 of the analog front-end 108 so that the amplitude of the IQ vector is substantially equal to a target amplitude, in order to increase and preferably optimize the dynamic range of the front-end 108. If the amplitude of the IQ vector is below the target amplitude, then the gain(s) of the VGA(s) within the gain adjustment circuit 130 is/are increased. Conversely, if the amplitude of the IQ vector is above the target amplitude, then the gain(s) of the VGA(s) within the gain adjustment circuit 130 is/are decreased. In other words, a gain adjustment feedback loop is used to adjust the amplitude of the IQ vector. The gain adjustment controller 150 can determine the amplitude of the IQ vector, e.g., by calculating the square root of the sum of the amplitude of digital I-signal squared and the amplitude of the digital Q-signal squared. Alternatively, the gain adjustment controller 150 can approximate the amplitude of the IQ vector by simply assuming that the amplitude of the IQ vector is equal to the greater of the amplitude of the digital I-signal and the amplitude of the digital Q-signal. In other words, the gain adjustment controller 150 can compare the amplitude of the digital I-signal to the amplitude of the digital Q-signal, and select which ever amplitude is greater as an approximation of the amplitude of the IQ vector. The gain adjustment controller 150 can alternatively use other techniques to determine or approximate the amplitude of the IQ vector. Alternatively, peak detectors can be used to monitor the swing of the amplitude adjusted light detection signal, and the gain adjustment controller 150 can adjust the gain to adjust the swing to a specified level.

The dynamic gain and phase offset corrector 153 corrects for dynamic variations in gain and phase offset of the analog front-end 108 that are due to changes in temperature and/or operating voltage levels of the analog front-end 108. Such changes in operating voltage levels can, e.g., be due to changes in voltage levels used to power components of the analog front-end 108. The crosstalk corrector 154 corrects for electrical crosstalk and/or optical crosstalk, depending upon implementation. The phase and magnitude calculator 156 calculates phase and magnitude values in dependence on the digital I-signal and the digital Q-signal received from the analog front-end 108, and more specifically, based on corrected versions thereof. The corrected versions of the digital I-signal and the digital Q-signal that are received by the phase and magnitude calculator 156 can also be referred to as the corrected IQ vector. Various well known algorithms, such as but not limited to a CORDIC algorithm, can be used to calculate the phase from the corrected IQ vector. The static phase offset corrector 158 corrects for a static phase offset of the optical proximity detector 102, which can also be referred to as distance offset calibration. The phase value output from the static phase offset corrector 158 can be stored in a register (e.g., 160) or memory (e.g., 162) within the digital back-end 112, or external to the digital back-end. Either way, such a register or memory can be accesses by another subsystem that is responsive to the phase, or more generally, to the distance between the target 105 and the optical proximity detector 102. It is also possible that the subsystem that accesses the stored phase simply responds to the presence of a target 105 within the range and field of view of the optical proximity detector 102.

In accordance with certain embodiments, the distance calculator 164 outputs a digital distance value based on the phase value it receives from the static phase offset corrector 158. For example, the distance calculator 164 can use the phase value it receives to determine a distance between the optical proximity detector 102 and a target 105, which can also be referred to as the distance to the target 105. For example, the phase value, which can also be referred to as the phase-offset (relative to the light emitted by the IR light source), can be converted to a time delay (because for any carrier frequency there is a corresponding relationship between phase-offset and time delay). The time delay can be converted to a roundtrip distance by multiplying the time delay by the well-known speed of light, as is typically done when using time-of-flight (TOF) principles. The roundtrip distance can be converted to a one-way distance, which is the distance between the optical proximity detector 102 and the object 105, by dividing the roundtrip distance by two. More specifically, the distance (d) between the optical proximity detector 102 and the object 105 can be determined using the equation: $d=(c*t)/2$, where c is the speed of light and t is the time delay. The distance calculator can be implemented using an arithmetic logic unit (ALU) or a look-up-table (LUT), but is not limited thereto. The digital value output by the distance calculator 164, which can be referred to as a digital distance value, can be an actual value of the distance to the object, e.g., 1.2 meters. Alternatively, the digital distance value output by the distance calculator 164 can be a value that is proportional to distance or otherwise related to distance to the object, from which an actual value of distance to the object can be calculated, e.g., by multiplying the value by a constant or plugging the value into a predetermined equation. More generally, the digital value output by the distance calculator 164 is indicative of distance between the optical proximity detector 102 and an object (e.g., the object 105) that is within the sense region (i.e., field of view and range) of the optical proximity detector 102. The static phase offset corrector 158 corrects for a static phase offset of the optical proximity detector 102, which can also be referred to as distance offset calibration. The digital distance value output from the distance calculator 164 can be stored in a register (e.g., 160) or memory (e.g., 162) within the digital back-end 112, or external to the digital back-end. Either way, such a register or memory can be accesses by another subsystem that is responsive to the distance between the target 105 and the optical proximity detector 102. It is also possible that the subsystem that accesses the stored digital distance value simply responds to the presence of a target 105 within the range and field of view of the optical proximity detector 102.

Additionally details of the operation of the dynamic gain and phase offset corrector 153, the crosstalk corrector 154 and the static phase offset corrector 158, are discussed below. A benefit of the digital back-end 112, described with reference to FIG. 1, performing corrections and calculations in IQ domain, is that the IQ domain is linear and can be approximated by a linear function. This advantageously allows linear processing techniques to be used, which can significantly ease implementation complexity.

In FIG. 1, the IQ Demodulator 140 is shown as being part of the analog front-end 108 and performing IQ demodulation in the analog domain upstream from the ADCs 146i, 146q. In alternative embodiments, the IQ Demodulator can be part of the digital back-end 112 and can perform IQ demodulation in the digital domain. More specifically, the amplitude adjusted light detection signal, which is output by the amplification circuitry 132, can be converted to a digital amplitude adjusted light detection signal by an ADC 146 of the analog front-end 108. The digital back-end 112 can then separate the digital amplitude adjusted light detection signal into digital in-phase and quadrature-phase versions thereof (which can also be referred to respectively as an I-component and a Q-component, or as simply as an I-signal and a Q-signal), wherein the digital quadrature-phase signal is 90 degrees out of phase relative to the digital in-phase signal. In other words, instead of performing the IQ demodulation between the amplification circuitry 132 and the ADCs 146, the IQ demodulation can alternatively be performed between an ADC 146 (e.g., implemented as a bandpass sigma delta ADC, but not limited thereto) and the dynamic gain and phase offset corrector 153. The dynamic gain and phase offset corrector 153, the crosstalk corrector 154, and the static phase offset corrector 158, described below, can be used with either of the above described embodiments, i.e., regardless of whether an IQ demodulator is part of the analog front-end or the digital back-end.

Dynamic Analog Gain and Phase Offset Correction

There are analog voltage regulators and/or other analog voltage supplies that provide power to analog components of the analog front-end 108, such as, but not limited to, the amplifier 122 and the one or more VGAs of the gain adjustment circuit 130. Such analog components are generally represented by the voltage supply 109 in FIG. 1. The operation of such analog components may vary depending upon the temperature of such components and/or the supply voltage provided to such components. More specifically, the gain of such analog components may vary (e.g., drib) depending upon the temperature of such components and/or the operating voltage of such components. Additionally, a phase offset caused by such components may vary depending upon the temperature of such components and/or the operating voltage of such components. If not dynamically compensated for, these dynamic changes in gain and phase offset may adversely affect phase calculations that are used to determine the distance of an object (e.g., 105) relative to the optical proximity detector 102. Specific embodiments, which will now be described, are used to compensate for such dynamic changes in gain and phase offsets of analog components of the analog front-end 108.

The dynamic response of the amplifier 122 and the gain adjustment circuit 130 of the analog front-end 112 (and more generally, the analog circuitry of the analog front-end prior to the IQ demodulator) can be mathematically represented by the following equation:

$$H(s)=H_O(s) \cdot A(V,T) \cdot e^{j\Phi(V,T)}$$

where
H(s) represents the overall response of the amplifier and the gain adjustment circuit of the analog front-end,
$H_O(s)$ represents the nominal response of the amplifier and the gain adjustment circuit of the analog front-end,
A(V,T) represents dynamic gain offset of the amplifier and the gain adjustment circuit of the analog front-end as a function of operating voltage and temperature, and
Φ(V,T) represents dynamic phase offset of the amplifier and the gain adjustment circuit of the analog front-end as a function of operating voltage and temperature.

In accordance with an embodiment, in order to compensate for the dynamic gain and phase offsets of the analog circuitry of the analog front-end prior to the IQ demodulator, the dynamic gain and phase offset corrector 153 has a transfer function substantially equal to $H_O(s)/H(s)=1/\{A(V,T) \cdot e^{j\Phi(V,T)}\}$. In other words, the dynamic gain and phase offset corrector 153 has a transfer function that is substantially equal to the inverse of the dynamic portion of the transfer function of the amplifier 122 and the gain adjustment circuit 130 of the analog front-end 112 (and more generally, the dynamic portion of the analog circuitry of the analog front-end prior to the IQ demodulator). If the transfer function of the dynamic gain and phase offset corrector 153 is $H_O/H'(s)$, then the desire is for H'(s) to be as close as possible to H(s). More generally, the dynamic analog gain and phase offset corrector 153 corrects for dynamic variations in gain and phase offset of the analog front-end 108 that are due to changes in temperature and/or supply voltage levels used to power components of the analog front-end 108.

In accordance with an embodiment, in order to estimate the response of the amplifier 122 and the gain adjustment circuit 130 of the analog front-end 112 (and more generally, the analog circuitry of the analog front-end prior to the IQ demodulator), a calibration reference signal is generated by a calibration reference signal generator 107 and provided to the analog front-end 108 using a switch SW during a calibration mode, which can more specifically be referred to as a dynamic gain and phase offset calibration mode or procedure. More specifically, the switch Sw connects an input of the analog front-end 108 to an output of the calibration reference signal generator 107 during the dynamic gain and phase offset calibration mode, and the switch Sw connects the input of the analog front-end 108 to the light detector 106 during an operational mode.

In accordance with certain embodiments, the calibration reference signal generated by the calibration reference signal generator 107 is essentially an attenuated version of the drive signal output by the driver 110 that is matched in phase with the drive signal output by the driver 1.1.0. In one embodiment, the calibration reference signal receives the same signal provided to an input of the driver 110 (i.e., the IrDr timing signal) and generates an output that is matched in phase to the output of the driver 110, but has a magnitude that is within the dynamic range of the analog front-end 108. In another embodiment, the calibration reference generator 107 includes a further light source and light detector (distinct from 104 and 106) that are configured as an optical coupler, wherein a. signal produced by the further light detector (of the optical coupler) is the calibration reference signal. In still another embodiment, the calibration reference signal generator 107 includes a sense resistor that senses the drive signal output by the driver 110, and an attenuator that attenuates a magnitude of the sensed drive signal without changing a phase of the drive signal. Alternatively, during the calibration mode, the driver 110 can output a drive signal having a reduced magnitude that is used as the calibration reference signal. Regardless of the implementation, a calibration reference signal is generated and provided to the analog front-end 108 using a switch Sw during the dynamic gain and phase offset calibration mode, wherein the calibration reference signal has the same phase as the drive signal output by the driver 110 and has a magnitude that is within the dynamic range of the analog front-end 108. Such a calibration reference signal can also be referred to as a zero-phase (ZP) calibration reference signal.

If there were no dynamic gain offset caused by the amplifier 122 and the gain adjustment circuit 130 of the analog front-end 112 (and more generally, by the analog circuitry of the analog front-end prior to the IQ demodulator), then the magnitude of the IQ vector (including the digital I-signal and the digital Q-signal) output by the ADCs 146i, 146q in response to the calibration reference signal being provided to the analog-front end 108 should be solely dependent on the magnitude of the calibration reference signal, a nominal level of gain caused by the amplifier 122, and a nominal level of gain caused by the gain adjustment circuit 130. Accordingly, the expected magnitude of the IQ vector (produced in response to the calibration reference signal being provided to the analog-front end 108) can be readily calculated or otherwise determined by directly computing the Pythagorean theorem or the CORDIC algorithm, but not limited thereto. However, because the actual levels of gain caused by the amplifier 122 and the gain adjustment circuit 130 will vary due to variations in temperature and/or operating voltage, the actual magnitude of the IQ vector (produced in response to the calibration reference signal being provided to the analog-front end 108) will differ from the expected magnitude, with the difference therebetween being the dynamic gain offset caused by the amplifier 122 and the gain adjustment circuit 130 of the analog front-end 108 (and more generally, by the analog circuitry of the analog front-end prior to the IQ demodulator). This difference between the actual magnitude of the IQ vector and the expected magnitude of the IQ vector, which can be determined during the calibration mode, will be referred to as the zero-phase gain offset or simply as $A_{ZP}$.

If there were no dynamic phase offset caused by the amplifier 122 and the gain adjustment circuit 130 of the analog front-end 108 (and more generally, by the analog circuitry of the analog front-end prior to the IQ demodulator), then the phase of the IQ vector (including the digital I-signal and the digital Q-signal) output by the ADCs 146i, 146q in response to the calibration reference signal being provided to the analog-front end 108 should be a nominal phase offset. In other words, the expected phase of the IQ vector (produced in response to the calibration reference signal being provided to the analog-front end 108) is a nominal phase. However, because the amplifier 122 and the gain adjustment circuit 130 cause a phase offset that will vary due to variations in temperature and/or operating voltage, the actual phase of the IQ vector (produced in response to the calibration reference signal being provided to the analog-front end 108) will differ from the expected nominal phase offset, with the difference therebetween being the dynamic phase offset caused by the amplifier 122 and the gain adjustment circuit 130 of the analog front-end 108 (and more generally, by the analog circuitry of the analog front-end prior to the IQ demodulator). This difference between the actual phase of the IQ vector and the expected phase of IQ vector, which can be determined during calibration mode, will be referred to as the zero-phase phase offset or simply as $\Phi_{ZP}$.

In accordance with an embodiment, the zero-phase gain offset (i.e., $A_{ZP}$) and the zero-phase offset (i.e., $\Phi_{ZP}$) are determined during the calibration mode, and used to determine the transfer function that is applied by the dynamic gain and phase offset corrector 153 during the operational mode. More specifically, in accordance with an embodiment, the transfer unction of the dynamic gain and phase offset corrector 153 is $$H_O/H'(s) = \frac{1}{A_{zp}} \cdot e_{ZP}^{-j\phi}.$$

Depending upon implementation, the aforementioned transfer function, which is applied by the dynamic gain and phase offset corrector 153, can also be used to correct for dynamic gain and phase offsets caused by the light source 104 and/or the light detector 106.

Crosstalk Correction

As noted above, the crosstalk corrector 154 corrects for electrical crosstalk and/or optical crosstalk, depending upon implementation. Electrical crosstalk can result, e.g. from a single ended relatively high current in-phase drive signal, produced by the driver 110, which is used to drive the light source 104. More generally, electrical crosstalk can also be caused by undesired capacitive, inductive, and/or conductive coupling from one circuit, part of a circuit, or channel, to another, and/or due to undesired power supply coupling. Optical crosstalk can result, e.g., from specular reflections, Lambertian reflections, or leakage through the light barrier 103 that separates the light source 104 and the light detector 106. Exemplary further details of causes and sources of optical crosstalk were discussed above.

Optimally, if the driver 110 drives the infrared light source 104 and there is no target (e.g., 105) within the sense region (i.e., field of view and range) of the optical proximity detector 102, then no infrared light emitted by the infrared light source 104 should be incident on the light detector 106, and no signal should be provided to analog-front end, in which case the digital I-signal and the digital Q-signal should have a zero magnitude. However, due to electrical crosstalk and optical crosstalk, this will not be the case. Certain embodiments described herein correct for such crosstalk, as explained below.

In accordance with an embodiment, crosstalk is determined during a crosstalk calibration procedure or mode, during which the light detector 106 is caused to be non-responsive to light incident on the light detector 106 from outside the optical proximity detector 102, and the light source 104 is driven by the driver 110 in the same manner it would be during the operational mode. The light that the light detector 106 should not be responsive to includes both light that originated from the light source 104 and exited the optical proximity detector 102, as well as ambient light that originated from another source of light. In one embodiment, the switch Sw can be used to disconnect the input of the amplifier 122 from the light detector 106, and instead connect the input of the amplifier 122 to a further light detector (e.g., a dummy or calibration light detector) that is substantially the same as the light detector 106 but is permanently covered with or encased within an opaque material so that no light is ever incident on the further light detector. In this embodiment, the digital I-signal and the digital Q-signal that are output by the ADCs 146 comprise an IQ vector that is indicative of the electrical crosstalk produced by the analog-front end 108, but is not indicative of optical crosstalk.

In another embodiment, the light detector 106 can be caused to be non-responsive to light incident on the light detector 106 from outside the optical proximity detector 102 by temporarily covering the light detector 106 with an opaque material so that no light that is incident on the optical proximity detector 102 will be incident on the light detector 106. In still another embodiment, the light detector 106 can be caused to be non-responsive to light incident on the light detector 106 from outside the optical proximity detector 102104 by temporarily placing the optical proximity detector in a completely dark environment (e.g., a sealed chamber or room) that does not include a target (e.g., 105) within the sense region of the optical proximity detector 102. In these latter two embodiments, the signal produced by the light detector 106 will include both electrical and optical crosstalk. More specifically, in these two latter embodiments the digital I-signal and the digital Q-signal that are output by the ADCs 146 will comprise an IQ vector indicative of the electrical crosstalk produced by the analog-front end 108, which is also indicative of optical crosstalk. Crosstalk error data indicative of this IQ vector is stored, e.g., in one or more registers 160 and/or in memory 162 (preferably in non-volatile memory), for use by the crosstalk corrector 154 during the operational mode of the optical proximity detector 102. More specifically, during the operational mode the IQ vector indicative of crosstalk can be subtracted from the dynamic gain and phase offset corrected IQ vector output by the dynamic gain and phase offset corrector 153 to produce a dynamic phase and offset corrected and crosstalk corrected IQ vector.

The aforementioned crosstalk error data can be stored, e.g., in one or more registers 160 or in memory 162 this is/are accessible to the crosstalk corrector 154. The above described crosstalk calibration procedure can performed just once, e.g., in a factory setting, or from time to time, e.g., periodically and/or in response to a triggering event.

Static Phase Offset Correction

The IQ vector that is output by the crosstalk corrector 154 can be referred to as the dynamic phase and offset corrected and crosstalk corrected IQ vector, or more simply as the corrected IQ vector. The phase and magnitude calculator 156 calculates phase and magnitude values in dependence on this corrected IQ vector, e.g., using a look up table, or a CORDIC algorithm, but not limited thereto. The magnitude value can be used by the gain adjustment controller 150 to adjust the gain provided by the gain adjustment circuit 130. The phase value can be used to calculate a distance between the optical proximity detector 102 and a target 105, which can also be referred to as the distance to the target 105. For example, the phase value, which can also be referred to as the phase-offset (relative to the light emitted by the IR light source), can be converted to a time delay (because for any carrier frequency there is a corresponding relationship between phase-offset and time delay). The time delay can be converted to a roundtrip distance by multiplying the time delay by the well-known speed of light, as is typically done when using time-of-flight (TOF) principles. The roundtrip distance can be converted to a one-way distance, which is the distance between the optical proximity detector 102 and the object 105, by dividing the roundtrip distance by two. More specifically, the distance (d) between the optical proximity detector 102 and the object 105 can be determined using the equation: $d=(c*t)/2$, where c is the speed of light and t is the time delay. Optimally, if a target 105 is positioned at a known distance (e.g. 6 inches) from the optical proximity detector 102, then the phase determined by the phase and magnitude calculator 156 should correspond to the target 105 being that known distance (e.g., 6 inches) from the optical proximity detector 102. However, due to a static phase offset associated with the analog-front end 108, this will not be the case. In other words, it is inherent that the analog circuitry within the front-end 108 will affect that accuracy of the phase determined by the phase and magnitude calculator 156. Certain embodiments described herein correct for such a static phase offset, as explained below.

in accordance with an embodiment, during a static phase offset calibration procedure or mode, a target 105 is placed at a known distance from the optical proximity detector 102, and the phase output by the phase and magnitude calculator 156 is compared to a phase that actually corresponds to the known distance. For example, if the phase that actually corresponds to the known distance is $\Phi_1$, but the phase and magnitude calculator 156 determines that the phase is $\Phi_2$ when an object 105 is at that known distance, then the static phase offset $\Phi_{spo}$ can be determined using the equation $\Phi_{spo}=\Phi_2-\Phi_1$. The static phase offset value error data can be stored, e.g., in one or more registers 160 or in memory 162 this is/are accessible to the static phase offset corrector 158. During the operational mode, the static phase offset corrector 158 corrects for a static phase offset of the optical proximity detector 102, which can also be referred to as distance offset calibration. More specifically, during the operational mode the static phase offset corrector 158 subtracts the static phase offset (determined during the static phase offset calibration procedure) from the phase value output by the phase and magnitude calculator 156.

In accordance with certain embodiments, the steps associated with the various calibration modes or procedures are performed prior to the steps associate with the operational mode. For example, the steps associated with the various calibration modes can be performed every time the steps associate with the operational mode are to be performed, or just one out of every N times the steps associate with the operational mode are to be performed, or when the steps associate with the operational mode are to be performed and it's been at least a specified amount of time since the last time one or more of the calibration mode(s) was/were performed. In specific embodiments, the steps associated with the crosstalk calibration mode and the static offset calibration mode are performed once, e.g., in a factory, and the steps associated with the dynamic gain and phase offset calibration mode are performed every time the steps associate with the operational mode are to be performed, or just one out of every N times the steps associate with the operational mode are to be performed, or when the steps associate with the operational mode are to be performed and it's been at least a specified amount of time since the last time the calibration mode was performed. These are just a few examples, which are not intended to be all encompassing.

Methods

Figure 2A:
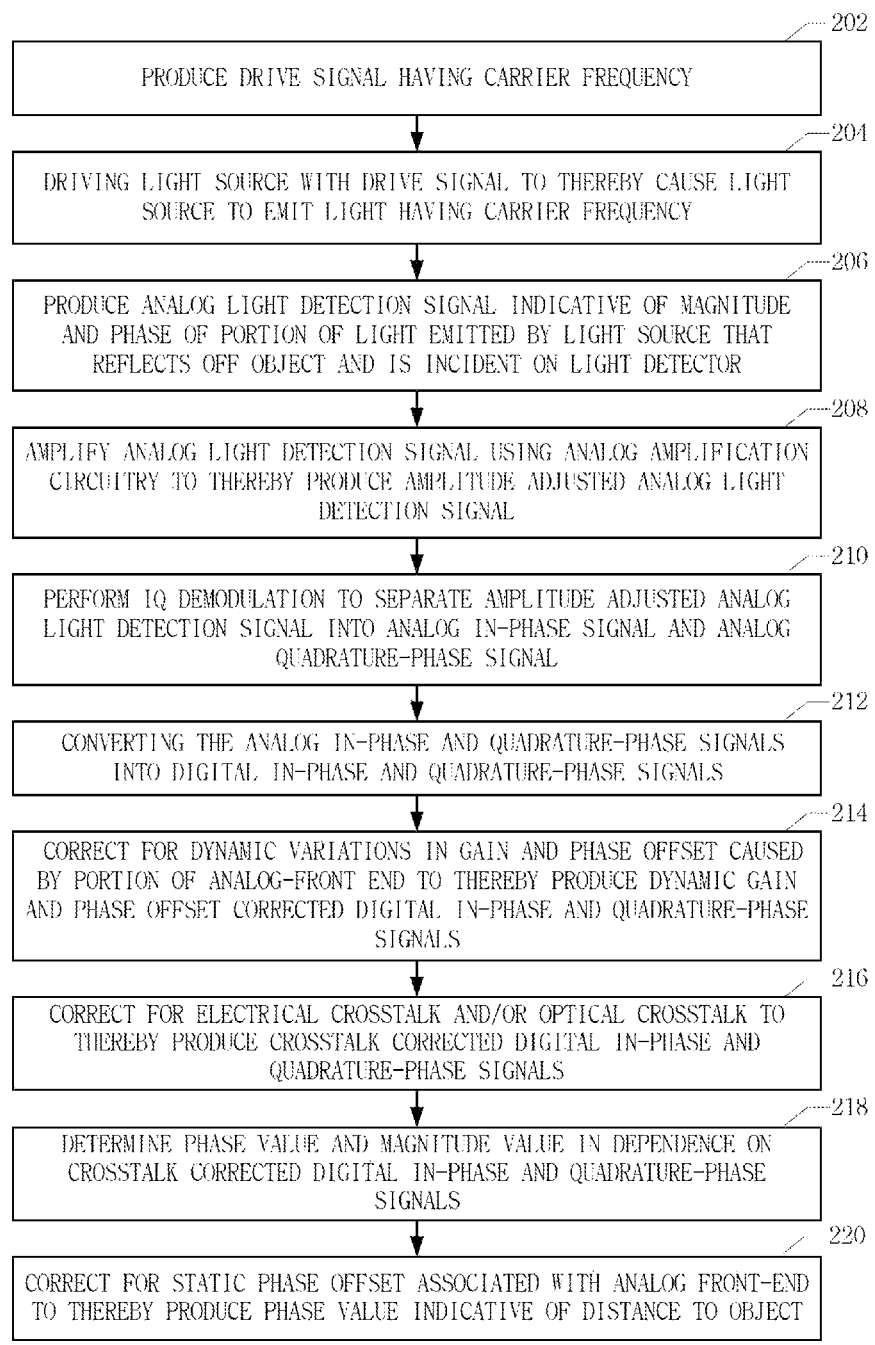
FIG. 2A is a high level flow diagram that is used to describe a method for use by an optical proximity detector, such as the one introduced in FIG. 1, during an operational mode.
Figure 2B:
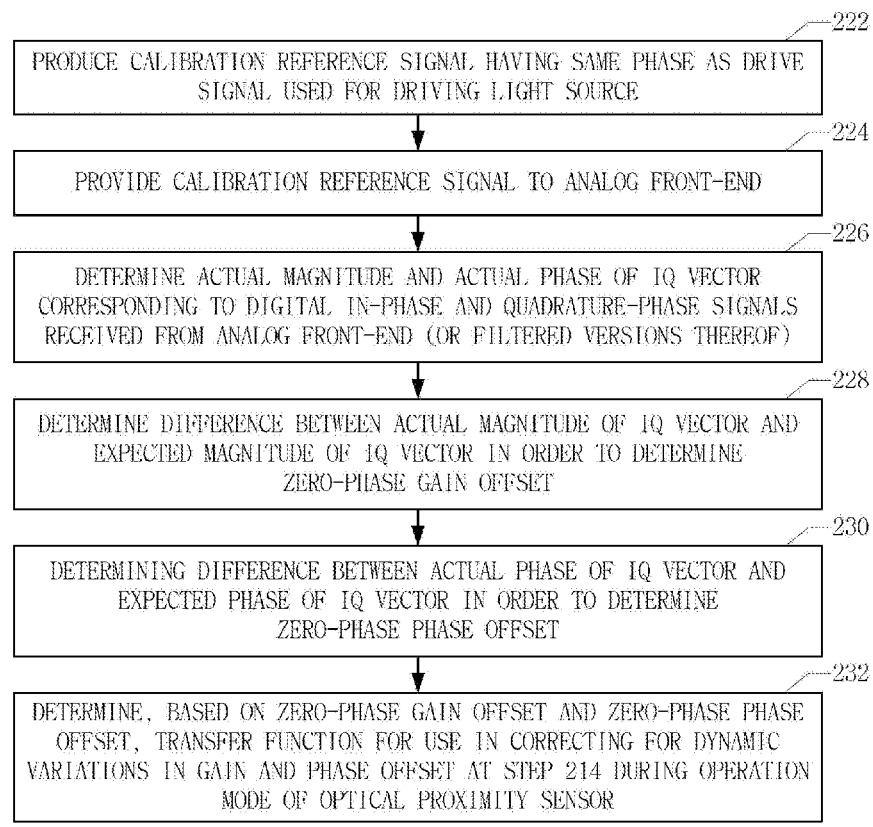
FIG. 2B is a high level flow diagram that is used to describe a method for use by an optical proximity detector, such as the one introduced in FIG. 1, during a dynamic gain and phase offset calibration mode.
Figure 2C:
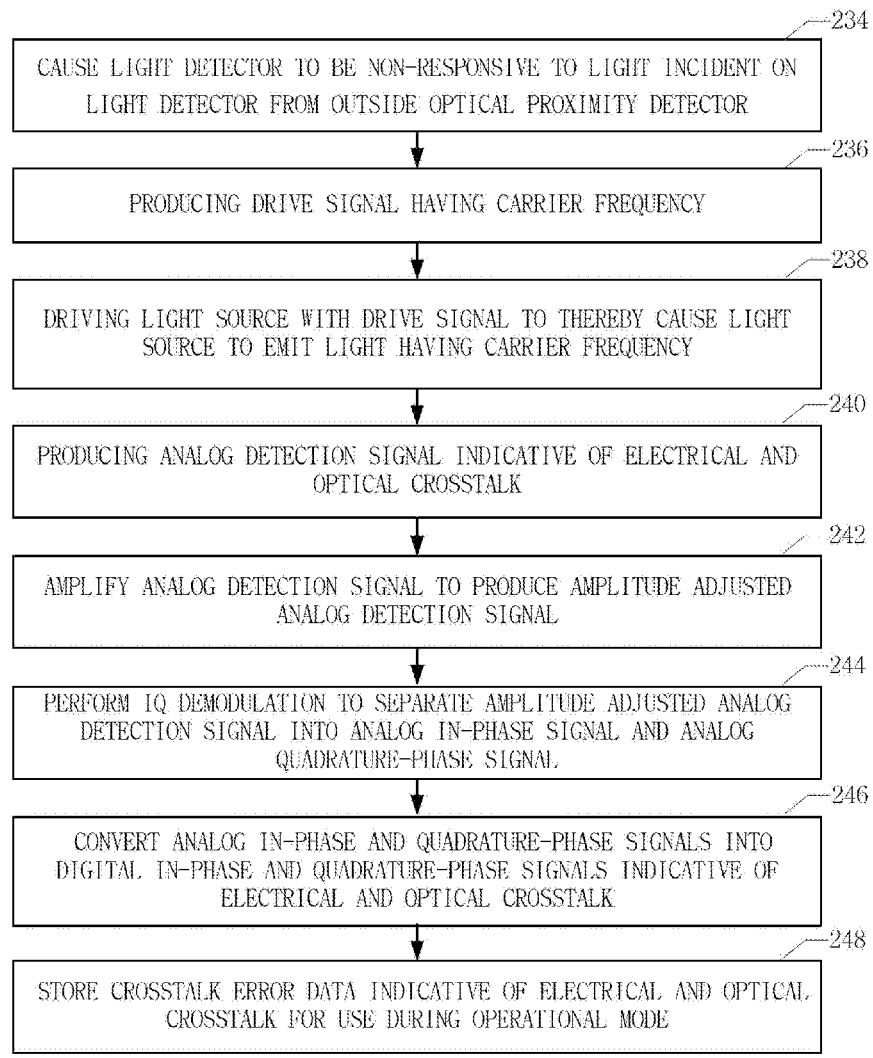
FIG. 2C is a high level flow diagram that is used to describe a method for use by an optical proximity detector, such as the one introduced in FIG. 1, during a crosstalk calibration mode.
Figure 2D:
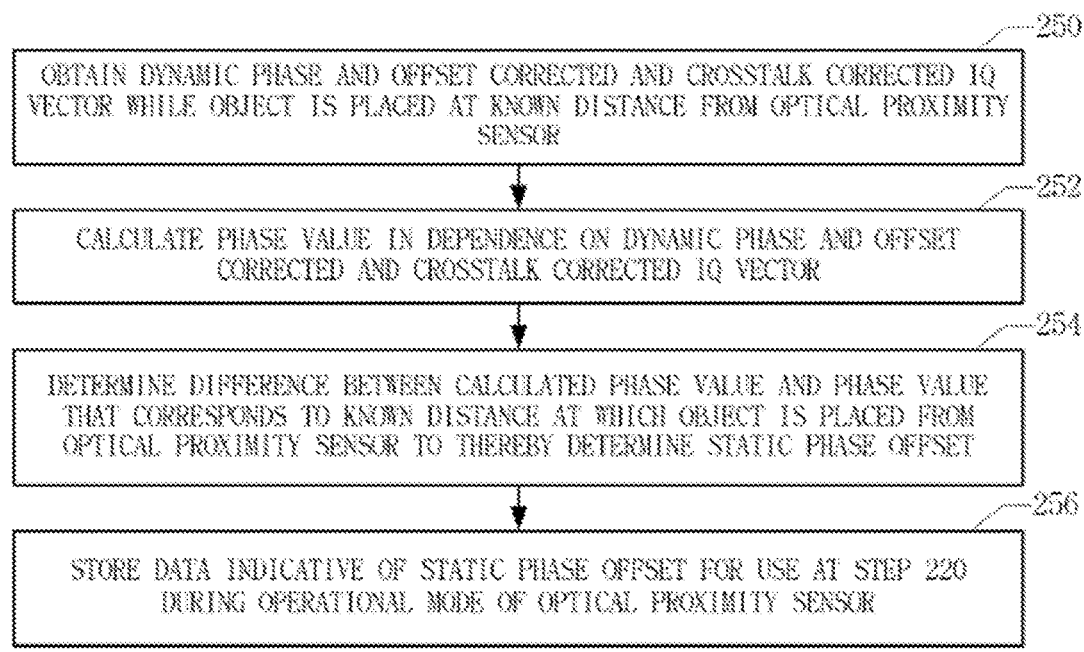
FIG. 2D is a high level flow diagram that is used to describe a method for use by an optical proximity detector, such as the one introduced in FIG. 1, during a static phase offset calibration mode.

The high level flow diagram of FIGS. 2A, 2B, 2C and 2D will now be used to describe methods that are for use with an optical proximity detector, such as the optical proximity detector 102 described with reference to FIG. 1. The steps described with reference to FIG. 2A are intended to be performed during an operational mode of the optical proximity detector. The steps described with reference to FIG. 2B are intended to be performed during a dynamic gain and phase offset calibration mode or procedure of the optical proximity detector. The steps described with reference to FIG. 2C are intended to be performed during a crosstalk calibration mode or procedure. The steps described with reference to FIG. 2D are intended to be performed during a static phase offset calibration procedure.

As will be appreciated from the following discussion, and as mentioned above, at least one instance of the calibration procedures described with reference to FIGS. 2B, 2C and 2D should be performed before the first instance of the operational procedure or mode described with reference to FIG. 2A, so that the optical proximity detector can determine (during the calibration procedure) the appropriate values, vectors, transfer functions and/or the like, to use during the operational mode.

Referring to FIG. 2A, a drive signal having a carrier frequency is produced, as indicated at step 202. Step 202 can be performed, e.g., by the driver 110 described above with reference to FIG. 1. As indicated at step 204, a light source (e.g., 106 in FIG. 1) is driven with the drive signal to thereby cause the light source to emit light having the carrier frequency. At step 206, an analog light detection signal is produced, which is indicative of a magnitude and a phase of a portion of the light emitted by the light source that reflects off an object and is incident on a light detector (e.g., 106 in FIG. 1). At step 208, the analog light detection signal is amplified using analog amplification circuitry (e.g., 132 in FIG. 1) to thereby produce an amplitude adjusted analog light detection signal. At step 210, IQ demodulation is performed to separate the amplitude adjusted analog light detection signal into an analog in-phase signal and an analog quadrature-phase signal. Step 210 can be performed, e.g., by the IQ demodulator 140 described above with reference to FIG. 1. At step 212, the analog in-phase and quadrature-phase signals are converted into digital in-phase and quadrature-phase signals. Step 212 can be performed, e.g., by the ADCs 146*i*, 146*q* described above with reference to FIG. 1. More generally, steps 202-212 can be performed by an analog front-end, such as, but not limited to, the analog front-end 108 described above with reference to FIG. 1.

As explained above in the discussion of FIG. 1, rather than performing IQ demodulation in the analog domain, IQ demodulation can alternatively be performed in the digital domain by the digital back-end 112. Accordingly, more generally, between steps 208 and 214 in FIG. 2A there is a producing of digital in-phase and quadrature-phase signals in dependence on the amplitude adjusted analog light detection signal.

At step 214, a correction is performed for dynamic variations in gain and phase offset caused by a portion of the analog-front end to thereby produce dynamic gain and phase offset corrected digital in-phase and quadrature-phase signals. At step 216, a correction for electrical crosstalk and/or optical crosstalk is performed to thereby produce crosstalk corrected digital in-phase and quadrature-phase signals. The corrections at steps 216 and 218 are examples of closed-loop corrections which rely on closed feedback loop(s) to perform corrections. At step 218, a phase value and a magnitude value is determined in dependence on the crosstalk corrected digital in-phase and quadrature-phase signals. At step 220, a correction for a static phase offset associated with the analog front-end is performed to thereby produce a phase value indicative of a distance to the object. Steps 214-220 can be performed by a digital back-end, such as, but not limited to, the digital back-end 112 described above with reference to FIG. 1. More specifically, steps 214, 216, 218 and 220 can be performed, respectively, by the dynamic gain and phase offset corrector 153, the crosstalk corrector 154, the phase and magnitude calculator 156 and the static phase offset corrector 158.

Referring back to step 214, the portion of the analog front-end, for which dynamic variations in gain and phase offset are corrected, can include amplification circuitry (e.g., 132 in FIG. 1) used to perform the amplifying at step 208. As explained above, such dynamic variations in gain and phase offset can be due to dynamic variations in the temperature and/or operating voltage associated with the amplification circuitry. Additionally, the portion of the analog front-end, for which dynamic variations in gain and phase offset are corrected for at step 214, can include the light source and/or the light detector (e.g., 104 and/or 106 in FIG. 1).

The amplification circuitry, used to perform the amplifying at step 208, has a transfer function that includes a nominal portion corresponding to a nominal response of the amplification circuitry and a dynamic portion corresponding to a dynamic gain offset and a dynamic phase offset of the amplification circuitry. In accordance with an embodiment, the correcting for dynamic variations in gain and phase offset that is performed at step 214 is performed using a DSP and/or digital circuitry that applies a transfer function that is substantially equal to an inverse of the dynamic portion of the transfer function of the analog amplification circuitry. If the aforementioned transfer function (which includes the nominal portion and the dynamic portion) also includes the response of the light source and/or light detector, then the aforementioned inverse transfer function used at step 214 can also correct for dynamic variations in gain and phase offset caused by the light source and/or light detector.

In accordance with an embodiment, steps 202-212 are performed by an analog front-end of an optical proximity detector, and steps 214-220 are performed by a digital back-end of the optical proximity detector. As mentioned above, steps 202-220, described with reference to FIG. 2A are performed during an operational mode of the optical proximity detector. FIGS. 2B, 2C and 2D will now be used to describe steps that can be performed during various calibration modes of the optical proximity detector.

FIG. 2B is a high level flow diagram that is used to describe a method for use by an optical proximity detector, such as the one introduced in FIG. 1, during a dynamic gain and phase offset calibration mode. Referring to FIG. 2B, at step 222 a calibration reference signal is produced that has a same phase as the drive signal used for driving the light source. Step 222 can be performed, e.g., using the calibration reference signal generator 107 described above with reference to FIG. 1. At step 224, the calibration reference signal is provided to the analog front-end, e.g., using the switch Sw in FIG. 1. At step 226, an actual magnitude and an actual phase of an IQ vector corresponding to digital in-phase and quadrature-phase signals received from the analog front-end, or filtered versions thereof, are determined. At step 228, a difference between the actual magnitude of the IQ vector and an expected magnitude of the IQ vector is determined in order to determine a zero-phase gain offset. At step 230, a difference between the actual phase of the IQ vector and an expected phase of the IQ vector is determined in order to determine a zero-phase phase offset. At step 232, based on the zero-phase gain offset and the zero-phase phase offset, there is a determination of a transfer function that is for use in correcting for dynamic variations in gain and phase offset at step 214 during the operational mode of the optical proximity detector. Step 232 can also include storing data indicative of the determined transfer function. Steps 224-232 can be performed, e.g., by the dynamic gain and phase offset corrector 153 in FIG. 1, or a DSP, or more generally a processor. Such a DSP, or more generally processor, may or may not be the same one that is used to implement the dynamic gain and phase offset corrector 153 in FIG. 1.

FIG. 2C is a high level flow diagram that is used to describe a method for use by an optical proximity detector, such as the one introduced in FIG. 1, during a crosstalk calibration mode to determining values or vectors for use at step 216 (during the operational mode) to correct for electrical and/or optical crosstalk. Referring to FIG. 2C, at step 234, the light detector (e.g., 106 in FIG. 1) is caused to be non-responsive to light incident on the light detector 106 from outside the optical proximity detector 102. Exemplary details of how to perform step 234 were described above, and thus, need not be repeated. At step 236 and 238, respectively, the drive signal having the carrier frequency is produced (e.g., by the driver 110 in FIG. 1), and the light source is driven with the drive signal to thereby cause the light source to emit light having the carrier frequency. At step 240, an analog detection signal indicative of electrical and optical crosstalk is produced. At step 242, the analog detection signal is amplified using amplification circuitry (e.g., 132 in FIG. 1) to thereby produce an amplitude adjusted analog detection signal. At step 244, IQ demodulation is performed to separate the amplitude adjusted analog detection signal into an analog in-phase signal and an analog quadrature-phase signal. At step 246, the analog in-phase and quadrature-phase signals are converted into digital in-phase and quadrature-phase signals indicative of electrical and optical crosstalk. At step 248, crosstalk error data indicative of electrical and optical crosstalk is saved (e.g., in registers 160 or memory 162 in FIG. 1) for use during the operational mode. Preferably the crosstalk error data is saved in non-volatile memory.

FIG. 2D is a high level flow diagram that is used to describe a method for use by an optical proximity detector, such as the one introduced in FIG. 1, during a static phase offset calibration mode. Referring to FIG. 2D, while an object is placed at a known distance from optical proximity detector (e.g., 102), a dynamic phase and offset corrected and crosstalk corrected IQ vector is obtained, as indicated at step 250. This step can be performed by essentially performing steps 202-216 described above with reference to FIG. 2A, while an object is placed at a known distance from the optical proximity detector. At step 252, a phase value is calculated in dependence on the dynamic phase and offset corrected and crosstalk corrected IQ vector. This step can be performed by essentially performing step 218 described above with reference to FIG. 2A. At step 254, a difference is determined between the phase value calculated at step 252 and a phase value that corresponds to the known distance at which the object is placed from the optical proximity detector, to thereby determine the static phase offset. At step 256, data indicative of the static phase offset is saved (e.g., in a register or memory) for use at step 220 during the operational mode.

Figure 3:
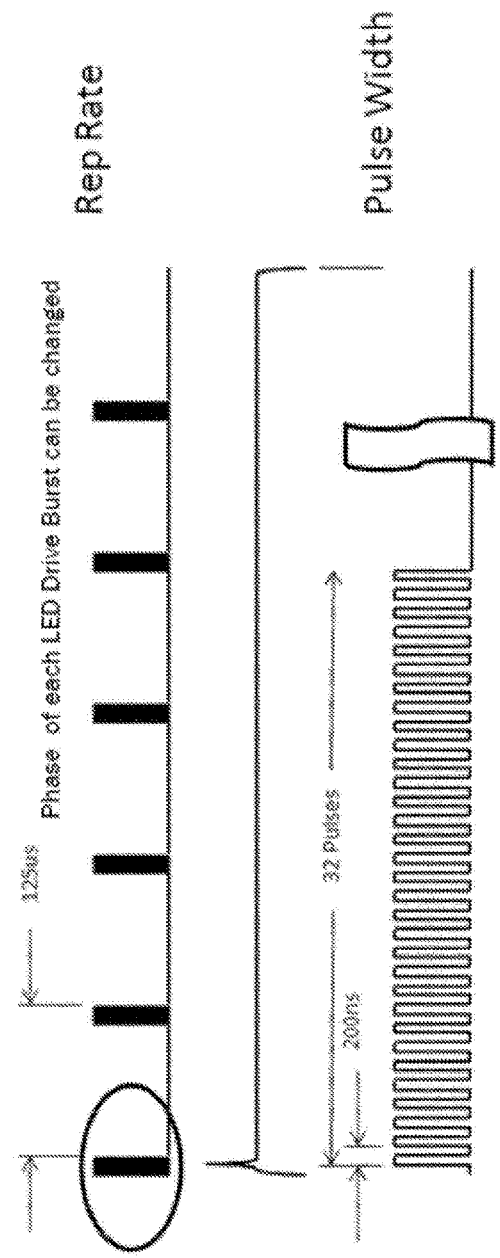
FIG. 3 illustrates an exemplary repetition rate and an exemplary pulse width of the drive signal produced by the driver introduced in FIG. 1.

FIG. 3 illustrates an exemplary repetition rate and an exemplary pulse width of the drive signal produced by the driver 110.

Corrections for Residual Errors

Optical proximity sensors that utilize time of flight (TOF) principles when implemented using real circuits, tend to be susceptible to a number of factors, including, but not limited to, dynamic variations in temperature, supply voltage, light source forward voltage drop, ambient light and signal strength. In other words, dynamic variations in temperature, supply voltage, light source forward voltage drop, ambient light and signal strength can affect real circuits of optical proximity sensors that utilize TOF principles, and thus, can affect the accuracy of phase and/or distance value produced by such optical proximity sensors. Closed loop calibrations that utilize a calibration reference signal can be used to reduce errors resulting from such dynamic variations. Examples of such closed loop calibrations were described above. While such closed loop calibrations can be used to significantly reduce errors, and thereby, to significantly increase the accuracy of phase and/or distance values produced by an optical proximity sensor that utilizes TOF principles, residual errors may still remain that adversely affect the accuracy.

Residual errors may result where dynamic variations in temperature, supply voltage, light source forward voltage drop, ambient light and/or signal strength occur faster than the closed loop calibrations can correct for such variations. Residual errors may also result from changes in gain values used by gain adjustment circuitry (e.g., 130 in FIG. 1), and more specifically, by VGAs of such circuitry. Residual errors may also result from phase errors that are outside of one or more closed loop calibration loops. For more specific examples, residual errors may occur due to one or more of the following factors: transimpedance amplifier (e.g., 122 in FIG. 1) phase variations associated with changes in ambient light that is incident on a light detector (e.g., 106 in FIG. 1); phase drift of a calibration reference signal (e.g., generated by the calibration reference signal generator 107 in FIG. 1); phase errors associated with gain adjustment circuitry (e.g., 130 in FIG. 1); delay drift associated with a light detector (e.g., 106 in FIG. 1); delay drift associated with a light source (e.g., 104 in FIG. 1); and constant time delays caused by oscillator drifts (e.g., associated with the timing generator 120 in FIG. 1). Additionally, or alternatively, residual errors may occur due to dynamic variations in optical crosstalk and/or electrical crosstalk that occur due to dynamic variations in ambient light incident on a light detector (e.g., 106 in FIG. 1) and/or due to dynamic variations in temperature. Residual errors may also occur due to dynamic variations or drift in a drive current used to drive a light source (e.g., 104 in FIG. 1), the forward voltage drop across the light source, as well as electro-optical efficiency of the light source. Other potential sources of residual errors relate to variations in the common-mode rejection ratio (CMRR) and/or power-supply rejection ratio (PSRR) associated with a transimpedance amplifier (TIA) (e.g., 122 in FIG. 1) and/or a low noise amplifier (LNA). Residual errors may also result from temperature dependent variations of luminous efficiency of a light source (e.g., 104 in FIG. 1) and/or temperature dependent variations in responsivity if a light detector (e.g., 106 in FIG. 1).

Figure 4:
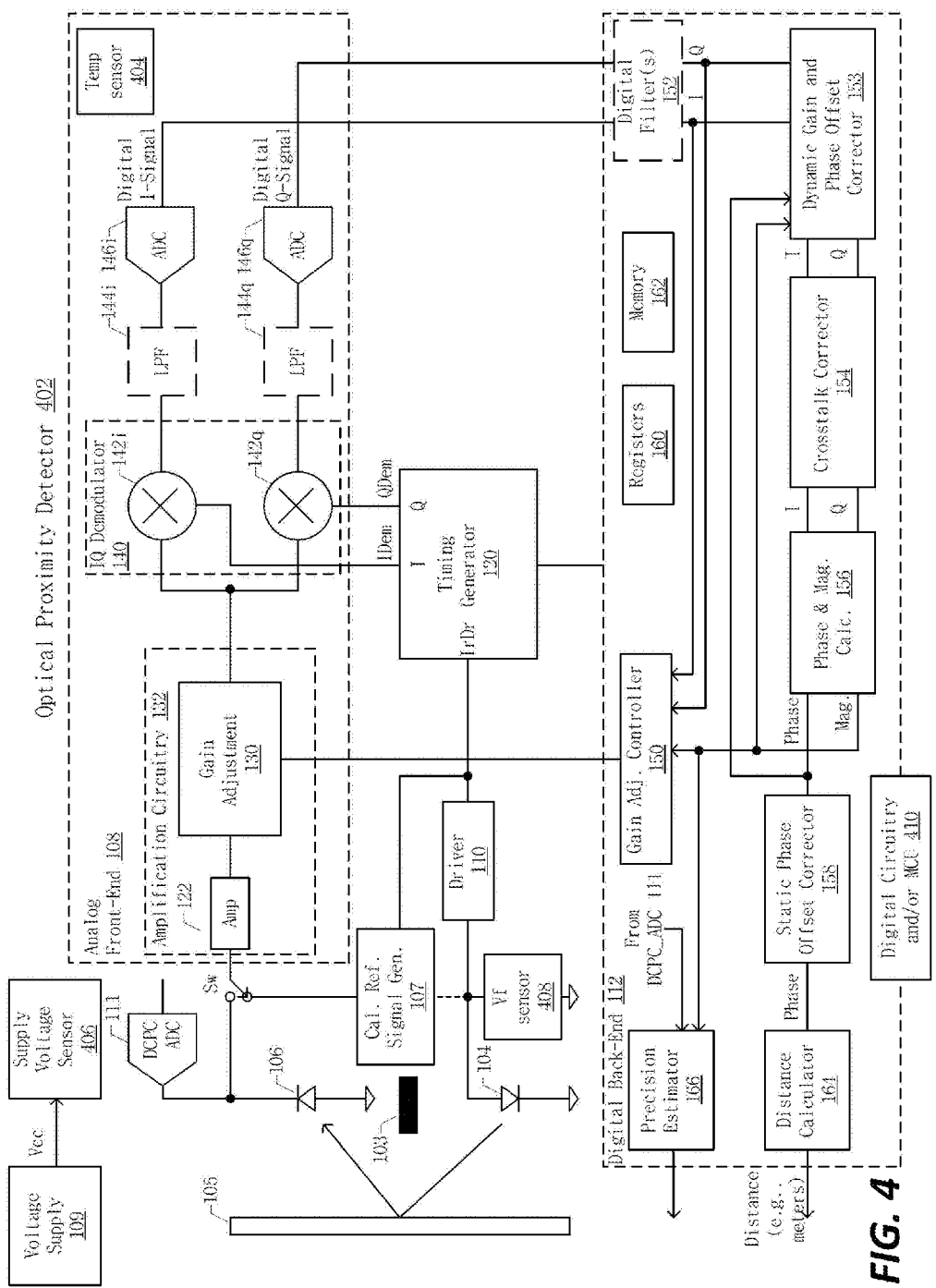
FIG. 4 illustrates an embodiment of an optical proximity detector, according to an embodiment.

FIG. 4 illustrates an optical proximity detector, according to an embodiment, that can correct for one or more of the above mentioned residual errors. Referring to FIG. 4, the optical proximity detector 402 shown therein includes all of the components included in the optical proximity detector 102, described above with reference to FIG. 1, plus some additional components. The components that are labeled the same way in FIG. 4 as they are in FIG. 1 operate in the same manner, and thus, need not be described again.

Referring to FIG. 4, the optical proximity detector 402 is shown as also including a temperature sensor 404, a supply voltage sensor 406 and a light source forward voltage drop sensor 408. In accordance with an embodiment: the temperature sensor 404 monitors the temperature of the optical proximity detector 402 and outputs a digital temperature signal; the supply voltage sensor 406 monitors the supply voltage (Vcc) produced by the voltage supply 109 and outputs a digital supply voltage signal; and the light source forward voltage drop sensor 408 (also referred to as the Vf sensor) monitors the forward voltage drop (Vf) across the light source 104 and outputs a digital forward voltage drop signal. Variations in the Vf across the light source 104, for a given drive signal, will be primarily due to changes in the temperature of the light source 104. In an embodiment, the temperature sensor 404 is implemented using an analog temperature transducer and an analog-to-digital converter (ADC) that outputs a digital signal having a magnitude that is proportional to the temperature of the optical proximity detector 402. In an embodiment, the supply voltage sensor 406 can be implemented using an analog-to-digital converter (ADC) that outputs a digital signal having a magnitude that is proportional to the supply voltage (Vcc). In an embodiment, the Vf sensor 408 is implemented using a resistor divider network and an analog-to-digital converter (ADC) that outputs a digital signal having a magnitude that is proportional to the forward voltage drop (Vf) across the light source 104. The digital signals produced by the temperature sensor 404, the supply voltage sensor 406 and the Vf sensor 408 can also be referred to as sensed digital values, or more specifically, as sensed correction factors. Another exemplary correction factor is/are the gain value(s) used by gain adjustment circuitry (e.g., 130). In accordance with an embodiment, one or more polynomial equation(s) is/are used to correct for one or more of the aforementioned residual errors. An exemplary second order polynomial equation is $P=P_0+P_1(x-x_0)+P_2(x-x_0)^2$, wherein P is the corrected value, $P_0$, $P_1$ and $P_2$ are coefficients that are determined through testing, the variable x is a sensed or measured correction value, and $x_0$ is the value of the variable x at the nominal condition (e.g., room temperature). As can be appreciated from this equation, when $x_0=x$, then $P=P_0$. In other words, at the nominal condition (e.g., room temperature), $P_0$ is the value for P, and thus, $P_0$ can also be referred to as the nominal value for the factor P. The variable(s), e.g., x, in the polynomial equation can be, e.g., the digital temperature value output by the temperature sensor 404, the digital supply voltage value output by the supply voltage sensor 406, or the Vf value output by the Vf sensor 408, but is not limited thereto.

An example of second order polynomial equation that can be used to perform a phase correction for one or more of the aforementioned factors is $\Phi=\Phi_0+\Phi_1(x-x_0)+\Phi_2(x-x_0)^2$. Such an equation can be used to correct the phase value produced by the phase and magnitude corrector 156 and/or the phase value produced by the static phase offset corrector 158. The variable x can be, for example, any one of the digital temperature value output by the temperature sensor 404, the digital supply voltage value output by the supply voltage sensor 406, or the Vf value output by the Vf sensor 408, but is not limited thereto. Assuming there is a desire to correct for variations in the temperature, supply voltage and Vf, then the following polynomial equation can be used: $\Phi=\Phi_0+\Phi_{1x}(x-x_0)+\Phi_{2x}(x-x_0)^2+\Phi_{1y}(y-y_0)^2+\Phi_{2y}(y-x_0)^2+\Phi_{1z}(z-z_0)+\Phi_{2z}(z-z_0)^2$, where x corresponds to temperature, y corresponds to supply voltage, and z corresponds to Vf. The coefficients and variables at the nominal conditions can be determined through experimentation, e.g., by locating an object 105 at a known distance from the optical proximity detector 402 and varying the temperature and supply voltage. The nominal conditions can include a nominal temperature (e.g., 21 degrees Celsius), a nominal supply voltage (e.g., 3.30V) and a nominal Vf (e.g., 0.70V), but are not limited thereto.

Similar equations that can be used to perform a crosstalk correction for one or more of the aforementioned factors are $I=I_0+I_1(x-x_0)+I_2(x-x_0)^2$, and $Q=Q_0+Q_1(x-x_0)+Q_2(x-x_0)^2$. Such equations can be used to correct I and Q values produced by the dynamic gain and phase offset corrector 153 and/or the I and Q values produced by the crosstalk corrector 154. The variable x can be, for example, any one of the digital temperature value output by the temperature sensor 404, the digital supply voltage value output by the supply voltage sensor 406, or the Vf value output by the Vf sensor 408, but is not limited thereto. Assuming there is a desired to correct for variations in the temperature, supply voltage and Vf, then the following polynomial equations can be used: $I=I_0+I_{1x}(x-x_0)+I_{2x}(x-x_0)^2+I_{1y}(y-y_0)+I_{2y}(y-x_0)^2+I_{1z}(z-z_0)+I_{2z}(z-z_0)^2$, and $Q=Q_0+Q_{1x}(x-x_0)+Q_{2x}(x-x_0)^2+Q_{1y}(y-y_0)+Q_{2y}(y-y_0)^2+Q_{1z}(z-z_0)+Q(z-z_0)^2$, where x corresponds to temperature, y corresponds to supply voltage, and z corresponds to Vf. The coefficients and variables at the nominal conditions can be determined through experimentation, e.g., by locating an object 105 at a known distance from the optical proximity detector 402 and varying the temperature and supply voltage. The nominal conditions can include a nominal temperature (e.g., 21 degrees Celsius), a nominal supply voltage (e.g., 3.30V) and a nominal Vf. (e.g., 0.70V), but are not limited thereto. For a further example, nominal conditions can include nominal gain values used by gain adjustment circuitry. Each of the variables used in the above algorithm could be excluded while enjoying the functionality provided by the rest of the variables. Similarly, other variables can be added at a relatively low incremental cost to the implementation. While the polynomial equations discussed above are second order polynomial equations, higher order equations can alternatively be used, as can negative power terms. It is also within the scope of embodiments described herein to use first order polynomial equations, although second or higher order polynomial equations should produce more accurate corrections.

The above equations can be performed using digital circuitry, e.g., that is part of a same chip that includes the other components of the optical proximity sensor 402. Alternatively, a separate digital chip can be dedicated to performing these algorithms. In still another embodiment, such algorithms can be performed using firmware of a host microcontroller unit (MCU) or microprocessor. Such digital circuitry and/or an MCU are represented by block 410 in FIG. 4. Other variations are also possible, and within the scope of an embodiment. In accordance with an embodiment, the digital circuit or microcontroller subroutine iteratively computes the contribution from each variable by reapplying itself to every combination of variable(s) desired.

Figure 5:
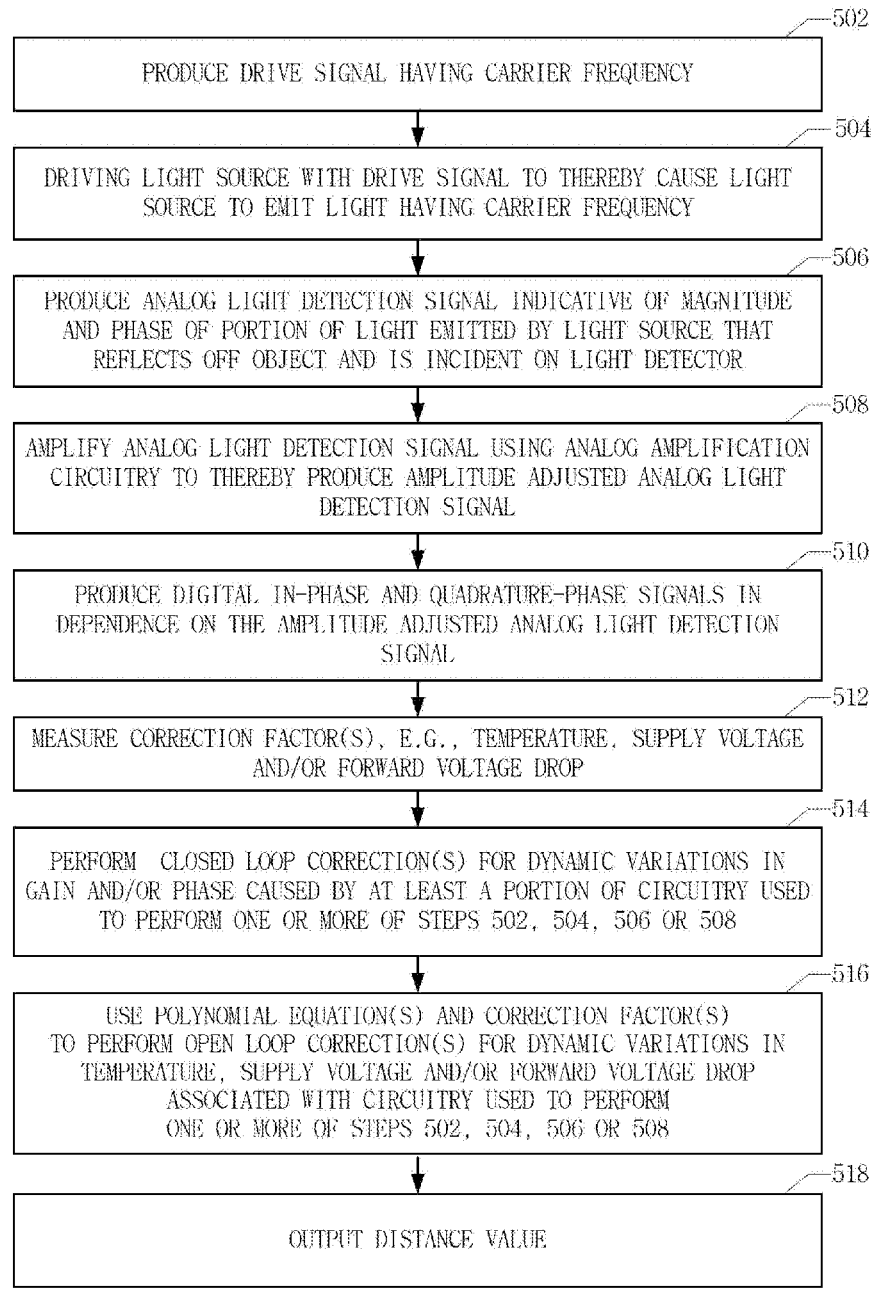
FIG. 5 is a high level flow diagram that is used to describe a method for performing open loop corrections for residual errors for use by an optical proximity detector, such as the one introduced in FIG. 4.

FIG. 5 is a high level flow diagram that is used to describe a method for performing open loop corrections for residual errors for use by an optical proximity detector, such as the one introduced in FIG. 4. Referring to FIG. 5, a drive signal having a carrier frequency is produced, as indicated at step 502. Step 502 can be performed, e.g., by the driver 110 described above with reference to FIGS. 1 and 4. As indicated at step 504, a light source (e.g., 104 in FIGS. 1 and 4) is driven with the drive signal to thereby cause the light source to emit light having the carrier frequency. At step 506, an analog light detection signal is produced, which is indicative of a magnitude and a phase of a portion of the light emitted by the light source that reflects off an object and is incident on a light detector (e.g., 106 in FIGS. 1 and 4). At step 508, the analog light detection signal is amplified using analog amplification circuitry (e.g., 132 in FIGS. 1 and 4) to thereby produce an amplitude adjusted analog light detection signal.

At step 510, digital in-phase and quadrature-phase signals are produced in dependence on the amplitude adjusted analog light detection signal. This step can include, e.g., performing IQ demodulation to separate the amplitude adjusted analog light detection signal into an analog in-phase signal and an analog quadrature-phase signal using an IQ demodulator (e.g., 140 in FIGS. 1 and 4). Such analog in-phase and quadrature-phase signals can be converted into digital in-phase and quadrature-phase signals using ADCs (e.g., 146i, 146q in FIGS. 1 and 4). More generally, step 510 can be performed by an analog front-end, such as, but not limited to, the analog front-end 108 described above with reference to FIGS. 1 and 4. As explained above in the discussion of FIG. 1, rather than performing IQ demodulation in the analog domain, IQ demodulation can alternatively be performed in the digital domain by a digital back-end (e.g., 112 in FIGS. 1 and 4).

Step 512 involves measuring one or more correction factors, including, e.g., temperature, supply voltage and/or forward voltage drop. Such correction factors can be measured, e.g., using a temperature sensor (e.g., 404 in FIG. 4), a supply voltage sensor (e.g., 406 in FIG. 4) and/or a forward voltage drop sensor (e.g., 408 in FIG. 4).

Step 514 involves performing one or more closed loop corrections for dynamic variations in gain and/or phase caused by at least a portion of circuitry used to perform one or more of steps 502, 504, 506 or 508. Step 514 can be performed, e.g., using a dynamic gain and phase offset corrector (e.g., 153 in FIGS. 1 and 4), a crosstalk corrector (e.g., 154 in FIGS. 1 and 4) and/or a gain adjustment controller (e.g., 150 in FIGS. 1 and 4).

Step 516 involves using one or more polynomial equations and at least one of the one or more sensed correction factors (measured at step 512) to perform one or more open loop corrections for dynamic variations in at least one of temperature, supply voltage or forward voltage drop associated with circuitry used to perform one or more of steps 502, 504, 506 or 508. Step 516 can be performed, e.g., by digital circuitry (e.g., that is part of a same chip that includes the other components of the optical proximity sensor), by a separate digital chip dedicated to performing these algorithms and/or using firmware of a host MCU, each and all of which is/are represented by the block 410 in FIG. 4.

For specific examples, step 512 can involve measuring the temperature of the optical proximity detector, and step 516 can involve using one or more polynomial equations and the measured temperature to perform open loop corrections for dynamic variations in the temperature of the optical proximity detector. Additionally, or alternatively, step 512 can involve measuring the supply voltage of the optical proximity detector, and step 516 can involve using one or more polynomial equations and the measured supply voltage to perform open loop corrections for dynamic variations in the supply voltage of the optical proximity detector. Additionally, or alternatively, step 512 can involve measuring the forward voltage drop across the light source driven by the drive signal, and step 516 can involve using one or more polynomial equations and the measured forward voltage drop across the light source to perform open loop corrections for dynamic variations in the forward voltage drop across the light source. As can be appreciated from the discussion above, such a method can also include determining coefficients of variables of the one or more polynomial equations at nominal conditions by locating an object at a known distance from the optical proximity sensor and purposely varying a temperature of the optical proximity sensor and a supply voltage of the optical proximity sensor. In an embodiment, step 508 involves using one or more gain values to control one or more variable gain amplifiers, and step 516 involves using one or more polynomial equations to correct for dynamic variations in at least one of the one or more gain values.

Still referring to FIG. 4, step 518 involves outputting a distance measurement (also referred to as a distance value) indicative of a distance between the optical proximity detector and an object off of which the light emitted by the light source reflects and is incident on the light detector. Step 518 can be performed, e.g., by a distance calculator (e.g., 164 in FIGS. 1 and 4). The distance value output at step 518 is produced as a result of the various closed and open loop corrections discussed above.

Precision Estimation

Optical proximity detectors that rely on TOF technology, and more specifically sine wave modulation. TOF (SWM TOF) technology, such as those described above, can be used to detect the distance to an object independent to the return signal strength. However, the distance information alone does not provide an indication of how precise the data is, potentially giving misleading results. Specific embodiments described herein allow a host system or user to evaluate both the distance and the precision information in real time, thereby allowing for statistical decision making. For example, precision information can be used to reduce false negative and/or false positive detection rates in a distance based binary detection scheme.

Generally speaking, the noise in a TOF based optical proximity detector increases as the square root of the ambient light induced DC photocurrent, as well as the noise bandwidth. The distance error caused by noise is inversely proportional to the signal-to-noise ratio (SNR). For example, 2× the integrated noise will result in a 2× increase in standard deviation of the distance (i.e., a 2× reduction in precision), while a 2× increase in signal strength will halve the standard deviation (i.e., with double the precision).

Access to the precision of a distance value can have many benefits, ranging from a simple screening of bad data, or as an input to a complex algorithm such as a Kalman filter.

In accordance with specific embodiments of the present technology, an optical proximity detector, or system including or in communication with an optical proximity detector, computes a precision value based on the following information:

Integration Time ($T_{int}$), which sets the Noise Bandwidth (NBW);

DC Photocurrent (DCPC), which is indicative of the photocurrent induced shot noise; and Signal Amplitude/Magnitude, which is indicative of the magnitude of the detected signal used to determine distance to a target.

In accordance with an embodiment, this computation is implemented using an arithmetic logic unit (ALU) which operates a sequence of algebraic operations to compute a final result. In another embodiment, a look-up-table (LUT) based solution can be implemented. Other implementations are also possible and within the scope of an embodiment.

Precision estimation can be implemented using a monolithic implementation, or multiple subsystems can cooperate to perform precision estimation. For example, the DCPC ADC 111 could be made off chip. For another example, the digital algorithm can be moved to a dedicated digital chip, or a host MCU.

In accordance with an embodiment, the precision estimator 166 provides an estimate of the distance precision in the same units as the distance readout codes, e.g., in units of meters, but is not limited thereto. For a more specific example, where the distance calculator 164 produces a distance value of 1.2 meters, the precision estimator may output a value of 0.1 meters, meaning that the distance value is better represented as 1.2 meters+/−0.1 meters. Alternatively, the precision estimator 166 produces a percentage value, e.g., 8.3%. For example, where the distance calculator 164 produces a distance value of 1.2 meters, and the precision estimator outputs a value of 8.3% meters, this means the distance value is actually 1.2 meters+/−8.3%. As noted above, the digital distance value output by the distance calculator 164 can be an actual value of the distance to the object. Alternatively, the digital distance value output by the distance calculator 164 can be a value that is proportional to a distance or otherwise related to a distance to the object, from which an actual value of distance to the object can be calculated, e.g., by multiplying the value by a constant or plugging the value into a predetermined equation. More generally, the digital distance value output by the distance calculator 164 is indicative of distance between the optical proximity detector 102 and an object (e.g., the object 105)

that is within the sense region (i.e., field of view and range) of the optical proximity detector 102, and the digital value output by the precision estimator is indicative of a precision of the digital distance value output by the distance calculator 164.

The information acquired from a SWM TOF optical proximity detector, such as those described above, can be considered a combination of two orthogonal in-phase and quadrature components I and Q, or as a vector with magnitude A and phase Φ. Conversion between the two domains are as follows:

$$I = A \cdot \cos(\Phi)$$

$$Q = A \cdot \sin(\Phi)$$

$$A = \sqrt{I^2 + Q^2}$$

$$\emptyset = \arctan(I/Q)$$

Error propagation between these two domains can be done by conducting gradient/small signal analysis. If an error is introduced in the in-phase and quadrature components, the error in phase can be approximated by conducting a small signal analysis, taking the partial derivative of arctan 2. For example, the following equations can be used to estimate an error introduced by in-phase and quadrature components:

$$\frac{\delta \phi}{\delta I} = \frac{Q}{I^2 + Q^2}$$

$$\frac{\delta \phi}{\delta Q} = \frac{I}{I^2 + Q^2}$$

$$\Delta \phi = \frac{Q \Delta I + I \Delta Q}{I^2 + Q^2}$$

This approximation starts to degrade once the error terms become in excess of 10% of the signal terms, at which point a full vector algebra may be more appropriate to compute the errors.

If the error in each of the I and Q channels is considered to be uncorrelated with both the signal and each other, the expression can be simplified as the following:

$$Var(\phi) = Var\left(\frac{Q \Delta I}{I + Q^2} + \frac{I \Delta Q}{I + Q^2}\right)$$

$$Var(\phi) = Var\left(\frac{Q \Delta I}{I^2 + Q^2}\right) + Var\left(\frac{I \Delta Q}{I^2 + Q^2}\right)$$

$$Var(\phi) = \frac{Var(I) + Var(Q)}{(I^2 + Q^2)}$$

$$\sigma(\phi) = \frac{\sqrt{\sigma_I^2 + \sigma_Q^2}}{\sqrt{I^2 + Q^2}}$$

If the error is coming from a source prior to the point of demodulation, the following equation can be used:

$$\sigma_I = \sigma_Q = \sqrt{NoisePSD|_{fmod} \cdot NBW \cdot \frac{1}{\sqrt{2}}}$$

NBW is the noise bandwidth of the system

The entire expression can be simplified down to the following equation:

$$\sigma_\phi = \frac{\sqrt{NoisePSD|_{fmod} \cdot NBW}}{A} = \frac{1}{SNR}$$

$$\sigma_{distance} = \frac{1}{SNR} \cdot \frac{c}{4 \pi f_{mod}}$$

where a (i.e., sigma) represents standard deviation, $f_{mod}$ represents the operating frequency, and c is the speed of light.

In accordance with an embodiment, the precision. estimator 166 uses the above equation for $\sigma_{distance}$ to produce the digital precision value that it outputs. As can be appreciated from the above equation, the precision of an SWM TOF distance measurement is inversely proportional to the SNR, as well as to the operating frequency ($f_{mod}$).

In accordance with an embodiment, the SNR is calculated based on the signal magnitude (Mag. or A) output by the phase and magnitude calculator 156, shot noise spectral density $I_{shot}$ corresponding to ambient light detected by the light detector 106, analog circuit noise spectral density $I_{cld}$ corresponding to analog circuitry of the analog-front-end 108, and an integration time $T_{int}$ corresponding to the digital filter(s) 152. More specifically, in accordance with an embodiment, the SNR value, which is used to calculate the precision value, can be determined in accordance with the following equation:

$$SNR = \frac{I_{4.5MHz}}{\sqrt{I_n^2/(2T_{int})}}$$

Alternatively, the SNR, in terms of the peak to peak swing of the input current square wave, can be determined in accordance with the following equation:

$$SNR = \frac{I_{square}}{\sqrt{I_n^2/(2T_{int})}} \cdot \frac{2}{\pi}$$

In accordance with an embodiment, $I_n^2$ is determined in accordance with the following equation:

$$I_n^2 = I_{shot}^2 + I_{cla}^2$$

$$I_{shot}^2 = m \cdot 2qI_D$$

where:

$I_D$ is the DC current through the photodiode.

m=1.5 is the Noise Factor of the AFE.

The $I_{shot}$ is the noise power spectral density contribution of ambient light detected by the light detector 106. This is in contrast to the IR light detected by the light detector that originated from the IR light source 104, reflected off a target 105, and is incident on the light detector 106. In accordance with an embodiment, $I_{shot}$ is measured using the DCPC ADC 111 during a period of time that the IR light source 104 is not emitting IR light. In accordance with an embodiment, the analog circuit noise spectral density $I_{cla}$ is determined based on the design of the optical proximity detector 102, and is treated as a constant, and can be determined through simulations and/or experimentation and/or the use of circuitry design and/or mathematical software. The noise factor, m, will typically be in the range of about 1 to 3, and for this example is assumed to be 1.5 for the optical proximity detector 102. This noise factor may be different for different designs, as would be appreciated by one of ordinary skill in the art.

Figure 6:
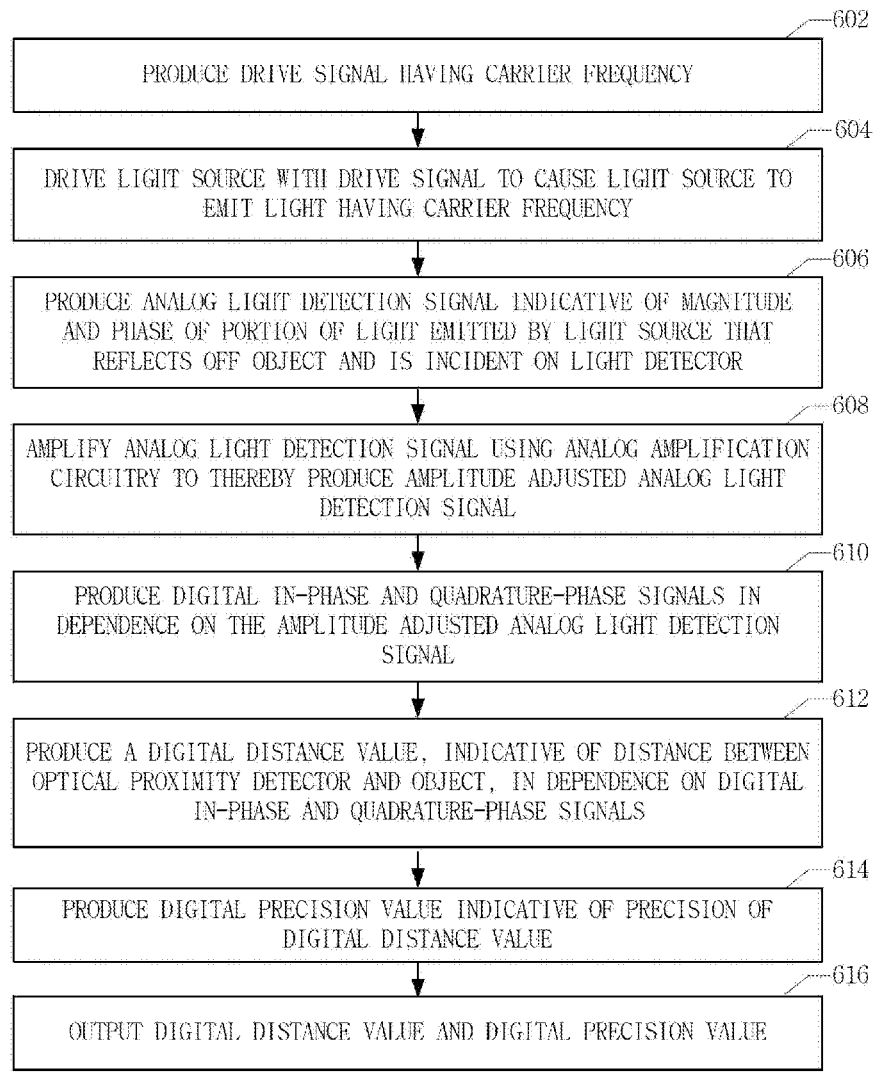
FIG. 6 is a high level flow diagram that is used to describe a method for providing estimates of precision for use by an optical proximity detector, such as the one introduced in FIG. 4.

FIG. 6 is a high level flow diagram that is used to describe a method for providing estimates of precision for use by an optical proximity detector, such as the one introduced in FIG. 4. Referring to FIG. 6, a drive signal having a carrier frequency is produced, as indicated at step 602. Step 602 can be performed, e.g., by the driver 110 described above with reference to FIGS. 1 and 4. As indicated at step 604, a light source (e.g., 104 in FIGS. 1 and 4) is driven with the drive signal to thereby cause the light source to emit light having the carrier frequency. At step 606, an analog light detection signal is produced, which is indicative of a magnitude and a phase of a portion of the light emitted by the light source that reflects off an object and is incident on a light detector (e.g., 106 in FIGS. 1 and 4). At step 608, the analog light detection signal is amplified using analog amplification circuitry (e.g., 132 in FIGS. 1 and 4) to thereby produce an amplitude adjusted analog light detection signal.

At step 610, digital in-phase and quadrature-phase signals are produced in dependence on the amplitude adjusted analog light detection signal. This step can include, e.g., performing IQ demodulation to separate the amplitude adjusted analog light detection signal into an analog in-phase signal and an analog quadrature-phase signal using an IQ demodulator (e.g., 140 in FIGS. 1 and 4). Such analog in-phase and quadrature-phase signals can be converted into digital in-phase and quadrature-phase signals using ADCs (e.g., 146$i$, 146$q$ in FIGS. 1 and 4). More generally, step 510 can be performed by an analog front-end, such as, but not limited to, the analog front-end 108 described above with reference to FIGS. 1 and 4. As explained above in the discussion of FIG. 1, rather than performing IIQ demodulation in the analog domain, IQ demodulation can alternatively be performed in the digital domain by a digital back-end (e.g., 112 in FIGS. 1 and 4).

At step 612, a digital distance value, indicative of a distance between the optical proximity detector and the object, is produced in dependence on the digital in-phase and quadrature-phase signals. Step 616 can be performed, at least in part, by a distance calculator (e.g., 164 in FIG. 4). In certain embodiments, step 612 can involve, e.g., performing one or more of closed loop and/or open loop corrections described above with reference to FIGS. 1-5. The closed loop corrections can be performed, e.g., using a dynamic gain and phase offset corrector (e.g., 153 in FIGS. 1 and 4), a crosstalk corrector (e.g., 154 in FIGS. 1 and 4) and/or a gain adjustment controller (e.g., 150 in FIGS. 1 and 4). The open loop corrections can be performed, e.g., by digital circuitry (e.g., that is part of a sane chip that includes the other components of the optical proximity sensor), by a separate digital chip dedicated to performing these algorithms and/or using firmware of a host MCU, each and all of which is/are represented by the block 410 in FIG. 4.

At step 614, a digital precision value is produced which is indicative of a precision of the digital distance value. In an embodiment, step 614 can includes determining a signal-to-noise ratio (SNR) associated with the analog light detection signal produced at step 606, and producing the digital precision value in dependence on the SNR. Determining the SNR, associated with the analog light detection signal produced at 606, can includes, e.g., determining a noise spectral density contribution of ambient light detected by the light detector, and determining the SNR in dependence on the determined noise spectral density contribution of ambient light detected by the light detector, as was described in additional detail above. In a specific embodiment, step 614 can include determining the digital precision value in dependence on an integration time that sets a noise bandwidth of the optical proximity detector, a DC photocurrent associated with the light detector that produces the analog light detection signal, and a magnitude of the analog light detection signal produced using the light detector. In certain embodiments, the digital precision value produced at step 614 is a measure indicative of standard deviation. For example, the digital precision value can be a constant multiple of standard deviation, depending upon a desired behavior and implementation. Step 614 can be performed by, e.g., by a precision estimator (e.g., 166 in FIG. 4).

At step 616, the digital distance value and the digital precision value are output. For example, the digital distance value can be output by a distance calculator (e.g., 164 in FIGS. 1 and 2), and the digital precision value can be output by a precision estimator (e.g., 166 in FIG. 4). The digital distance value and the digital precision value, which are output, can both be in a same unit of length. Alternatively, the digital distance value that is output is in a unit of length, and the digital precision value that is output corresponds to a percentage, as was explained above. Other variations are also possible.

In accordance with embodiments of the present invention, the smaller the digital precision value the better the signal integrity. In other words, the error bars associated with the distance measurement are smaller. Conversely, the greater the digital precision value the worse the signal integrity. In other words, the error bars associated with the distance measurement are larger, and thus, the digital distance value likely may not be trusted. More generally, a magnitude of the digital precision value can be inversely related to a precision of the digital distance value, such that a smaller the magnitude of the digital distance value a greater the precision of the digital distance value.

In certain embodiments, a method can also include determining, in dependence on the digital precision value, whether or not to use the digital distance value to selectively enable or disable a subsystem. For example, the digital precision value can be compared to a precision threshold level indicative of a specified minimum acceptable precision. In such an embodiment, if the digital precision value is below the precision threshold level, then there is a determination that the digital distance value should be used to selectively enable or disable the subsystem. On the other hand, if the digital precision value is above the precision threshold level, then there is a determination that the digital distance value should not be used to selectively enable or disable the subsystem.

Systems

Figure 7:
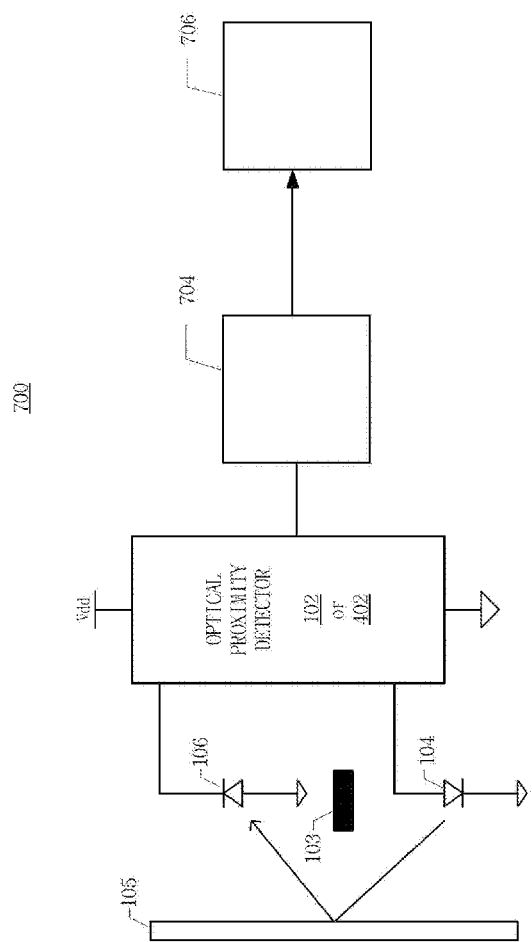
FIG. 7 illustrates a system, according to an embodiment, which includes the optical proximity detector introduced in FIG. 1 or 4.

Optical proximity detectors described herein can be used in various systems, including, but not limited to, cell-phones and handheld-devices. Referring to the system 700 of FIG. 7, for example, the optical proximity detector 102 or 402 can be used to control whether a subsystem 706 (e.g., a touch screen, display, backlight, virtual scroll wheel, virtual keypad, navigation pad, a camera, another sensor, a central processing unit (CPU), a mechanical actuator, etc.) is enabled or disabled. For example, the optical proximity detector can detect when an object, such as a person's finger, is approaching, and based on the detection either enable (or disable) a subsystem 706. More specifically, an output of the proximity detector 102 or 402 can be provided to a comparator or processor 704 which can, e.g., compare the output of the proximity detector to a threshold, to determine whether the object is within a range where the subsystem 706 should be enabled (or disabled, depending on what is desired). Multiple thresholds (e.g., stored digital values) can be used, and more than one possible response can occur based on the detected proximity of an object. For example, a first response can occur if an object is within a first proximity range, and a second response can occur if the object is within a second proximity range. Exemplary responses can include starting various system and/or subsystem operations.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, while the light source 104 and the light detector 106 in FIGS. 1 and 4 are shown as being external the optical proximity detector, one or both of the light source 104 and the light detector 106 can be considered part of the optical proximity detector 102 or 402, and more specifically part of the analog front-end of the optical proximity detector, depending upon implementation.

The breadth and scope of the present invention should not be limited by any of the above-described exemplary embodiments, but should be defined only in accordance with the following claims and their equivalents.

What is claimed is:

1. An optical proximity detector, comprising:
   a driver adapted to produce a drive signal for use in driving a light source to thereby cause the light source to emit light;
   a light detector adapted to produce a light detection signal indicative of a magnitude and a phase of a portion of the light emitted by the light source that reflects off an object and is incident on the light detector;
   an analog front-end adapted to receive the light detection signal produced by the light detector and in dependence thereon output a digital light detection signal, or digital in-phase and quadrature-phase signals; and
   a digital back-end adapted to
      receive the digital light detection signal, or the digital in-phase and quadrature-phase signals, from the analog front-end, and
      use one or more polynomial equations to perform one or more open loop corrections for dynamic variations in at least one of temperature, supply voltage or forward voltage drop so as to thereby determine a distance value indicative of a distance between the optical proximity detector and the object.

2. The optical proximity detector of claim 1, further comprising a temperature sensor adapted to measure the temperature of the optical proximity detector, wherein the digital back-end is further adapted to use at least one of the one or more polynomial equations and the temperature measured by the temperature sensor to perform open loop corrections for dynamic variations in the temperature of the optical proximity detector.

3. The optical proximity detector of claim 1, further comprising a supply voltage sensor adapted to measure the supply voltage of the optical proximity detector, wherein the digital back-end is further adapted to use at least one of the one or more polynomial equations and the supply voltage measured by the supply voltage sensor to perform open loop corrections for dynamic variations in the supply voltage of the optical proximity detector.

4. The optical proximity detector of claim 1, further comprising a forward voltage drop sensor adapted to measure the forward voltage drop across the light source driven by the driver of the optical proximity detector, wherein the digital back-end is further adapted to use at least one of the one or more polynomial equations and the forward voltage drop measured by the forward voltage drop sensor to perform open loop corrections for dynamic variations in the forward voltage drop across the light source driven by the driver of the optical proximity detector.

5. The optical proximity detector of claim 1, further comprising:
   a temperature sensor adapted to measure the temperature of the optical proximity detector,
   a supply voltage sensor adapted to measure the supply voltage of the optical proximity detector, and
   a forward voltage drop sensor adapted to measure the forward voltage drop across the light source driven by the driver of the optical proximity detector,
   wherein the digital back-end is further adapted to use at least one of the one or more polynomial equations, the measured temperature, the measured supply voltage and the measured forward voltage drop to perform open loop corrections for dynamic variations in the temperature, the supply voltage and the forward voltage drop.

6. The optical proximity detector of claim 1, wherein:
   the analog front end includes amplification circuitry that uses one or more gain values to control amplifying of the light detection signal produced by the light detector before the light detection signal is converted to the digital light detection signal or the digital in-phase and quadrature-phase signals; and
   the digital back-end is adapted to use at least one of the one or more polynomial equations to correct for dynamic variations in at least one of the one or more gain values.

7. The optical proximity detector of claim 1, wherein at least one of the one or more polynomial equations comprises a second order polynomial equation.

8. The optical proximity detector of claim 1, wherein the digital back-end includes digital circuitry adapted to implement the one or more polynomial equations.

9. The optical proximity detector of claim 1, wherein the digital back-end includes a microcontroller or microprocessor adapted to implement the one or more polynomial equations.

10. The optical proximity detector of claim 1, farther comprising the light source that is driven by the drive signal produced by the driver.

11. A method for use by an optical proximity detector, comprising:
   (a) driving a light source with a drive signal to thereby cause the light source to emit light;
   (b) producing an analog light detection signal indicative of a magnitude and a phase of a portion of the light emitted by the light source that reflects off an object and is incident on a light detector;
   (c) amplifying the analog light detection signal using amplification circuitry to thereby produce an amplitude adjusted analog light detection signal;
   (d) producing, in dependence on the amplitude adjusted analog light detection signal, digital in-phase and quadrature-phase signals;
   (e) using one or more polynomial equations to perform one or more open loop corrections for dynamic variations in at least one of temperature, supply voltage or forward voltage drop associated with circuitry used to perform one or more of steps (a), (b), (c) or (d) to thereby determine a distance value indicative of a distance between the optical proximity detector and the object.

12. The method of claim 11, further comprising:
(f) measuring the temperature of the optical proximity detector,
wherein step (e) further comprises using at least one of the one or more polynomial equations and the measured temperature to perform open loop corrections for dynamic variations in the temperature of the optical proximity detector.

13. The method of claim 11, further comprising:
(f) measuring the supply voltage of the optical proximity detector,
wherein step (e) further comprises using at least one of the one or more polynomial equations and the measured supply voltage to perform open loop corrections for dynamic variations in the supply voltage of the optical proximity detector.

14. The method of claim 11, further comprising:
(f) measuring the forward voltage drop across the light source driven by the drive signal,
wherein step (e) further comprises using at least one of the one or more polynomial equations and the measured forward voltage drop to perform open loop corrections for dynamic variations in the forward voltage drop across the light source.

15. The method of claim 11, further comprising:
(f) measuring the temperature of the optical proximity detector,
(g) measuring the supply voltage of the optical proximity detector, and
(h) measuring the forward voltage drop across the light source driven by the drive signal,
wherein step (e) further comprises using at least one of the one or more polynomial equations, the measured temperature, the measured supply voltage and the measured forward voltage drop to perform open loop corrections for dynamic variations in the temperature of the optical proximity detector, dynamic variations in the supply voltage of the optical proximity detector, and dynamic variations in the forward voltage drop across the light source.

16. The method of claim 11, wherein at step (c) one or more gain values is/are used to control the amplifying, and wherein at step (e) at least one of the one or more polynomial equations is used to correct for dynamic variations in at least one of the one or more gain values.

17. The method of claim 11, wherein at least one of the one or more polynomial equations comprises a second order polynomial equation.

18. The method of claim 11, farther comprising determining coefficients of variables of the one or more polynomial equations at nominal conditions by locating an object at a known distance from the optical proximity sensor and purposely varying a temperature of the optical proximity sensor and a supply voltage of the optical proximity sensor.

* * * * *